US011294056B2

(12) United States Patent
Bartlett et al.

(10) Patent No.: US 11,294,056 B2
(45) Date of Patent: *Apr. 5, 2022

(54) LIDAR WITH SPATIAL LIGHT MODULATOR

(71) Applicant: TEXAS INSTRUMENTS INCORPORATED, Dallas, TX (US)

(72) Inventors: Terry Alan Bartlett, Dallas, TX (US); Stephen Aldridge Shaw, Plano, TX (US); Patrick Ian Oden, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/735,197

(22) Filed: Jan. 6, 2020

(65) Prior Publication Data
US 2020/0142062 A1    May 7, 2020

Related U.S. Application Data

(63) Continuation of application No. 15/202,315, filed on Jul. 5, 2016, now Pat. No. 10,527,726.
(Continued)

(51) Int. Cl.
*G01C 3/08* (2006.01)
*G01S 17/10* (2020.01)
(Continued)

(52) U.S. Cl.
CPC .......... *G01S 17/10* (2013.01); *G01S 7/4814* (2013.01); *G01S 7/4817* (2013.01); *G01S 17/42* (2013.01)

(58) Field of Classification Search
CPC ...... G01S 7/4817; G01S 7/4814; G01S 17/10; G01S 17/42
See application file for complete search history.

(56) References Cited

U.S. PATENT DOCUMENTS 7,532,311 B2    5/2009  Henderson et al.
7,969,558 B2    6/2011  Hall
(Continued)

FOREIGN PATENT DOCUMENTS

JP    020019095452 A  *  6/2019  .......... G01S 7/4817

OTHER PUBLICATIONS

D. Stuart, O. Barter, & A. Kuhn, "Fast algorithms for generating binary holograms," arXiv:1409.1841v1 [physics.optics] Sep. 5, 2014, Clarendon Laboratory, University of Oxford, Parks Road, Oxford, OX1 3PU, UK, retrieved on Jul. 5, 2016, https://arxiv.org/pdf/1409.1841.
(Continued)

*Primary Examiner* — Mark Hellner
(74) *Attorney, Agent, or Firm* — Michelle F. Murray; Charles A. Brill; Frank D. Cimino

(57) ABSTRACT

A spatial light modulator (SLM) has an array of pixels configured to modulate light in patterns responsive to first control signals. The modulated light forms at least one patterned light beam in a field of view. An illumination source is optically coupled to the SLM. The illumination source is configured to illuminate the array of pixels, responsive to second control signals. Circuitry is coupled to the SLM and to the illumination source. The circuitry is configured to provide the first control signals to the SLM and the second control signals to the illumination source. At least one detector is configured to detect a reflection of the patterned light beam in the field of view.

20 Claims, 14 Drawing Sheets

Related U.S. Application Data

(60) Provisional application No. 62/188,035, filed on Jul. 2, 2015.

(51) Int. Cl.
    *G01S 7/481*     (2006.01)
    *G01S 17/42*     (2006.01)

(56) References Cited

U.S. PATENT DOCUMENTS

| | | | |
|---|---|---|---|
| 8,587,686 B1 * | 11/2013 | Riza | G01S 7/481 |
| | | | 348/222.1 |
| 8,917,395 B2 | 12/2014 | Dalgleish et al. | |
| 9,019,503 B2 | 4/2015 | Quyang | |
| 9,935,514 B1 * | 4/2018 | Lenius | G01S 17/02 |
| 2006/0227317 A1 * | 10/2006 | Henderson | G01S 17/89 |
| | | | 356/28 |
| 2013/0088726 A1 * | 4/2013 | Goyal | G01S 17/10 |
| | | | 356/634 |
| 2015/0378011 A1 | 12/2015 | Owechko | |

OTHER PUBLICATIONS

PA. Blanche, D. Carothers, J. Wissinger & N. Peyghambarian, "Digital micromirror device as a diffractive reconfigurable optical switch for telecommunication," Journal of Micro/Nanolithography, MEMS and MOEMS, vol. 13 (1):pp. 011104-1-5, Jan.-Mar. 2014.

\* cited by examiner

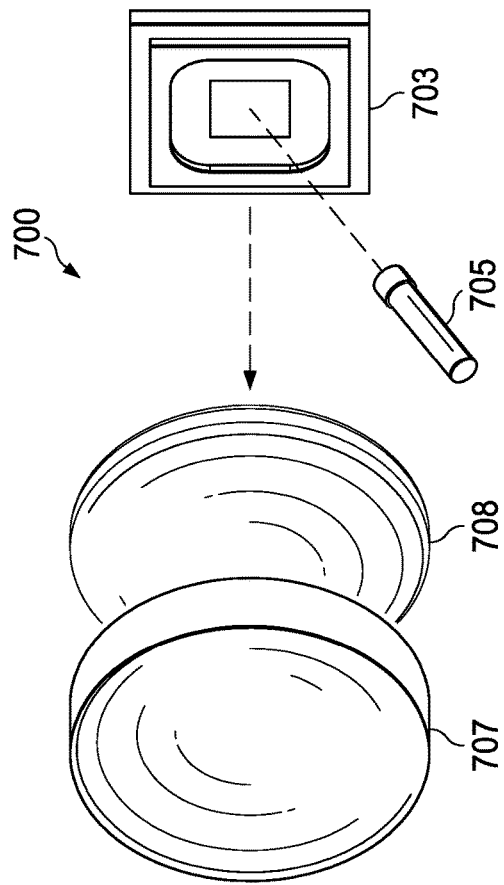
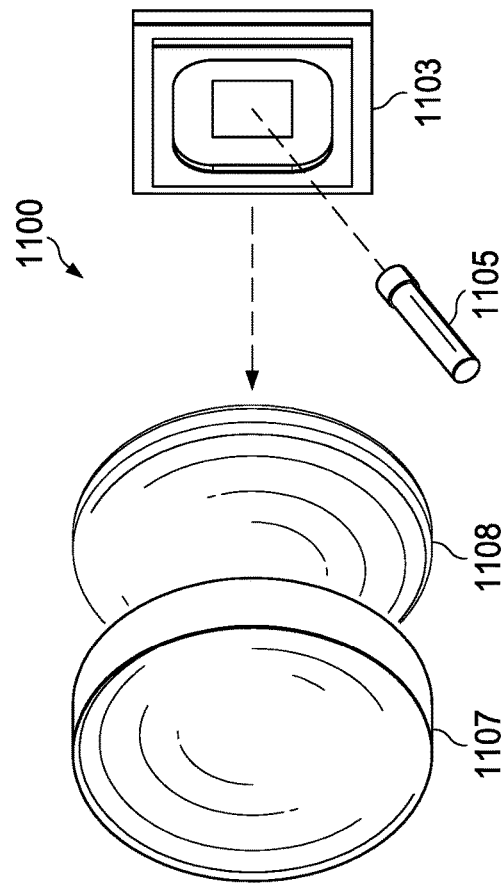
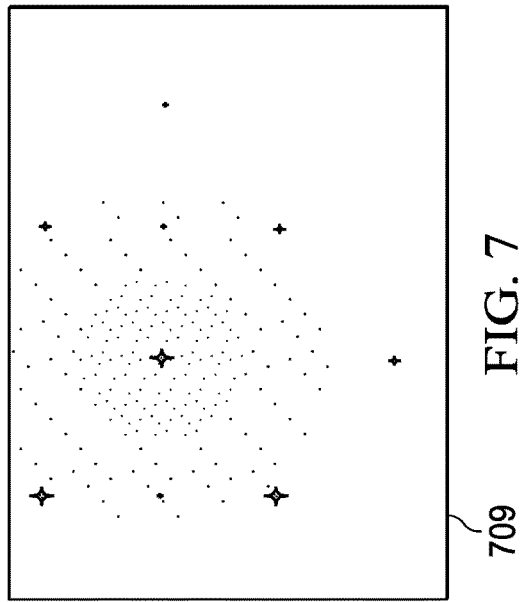
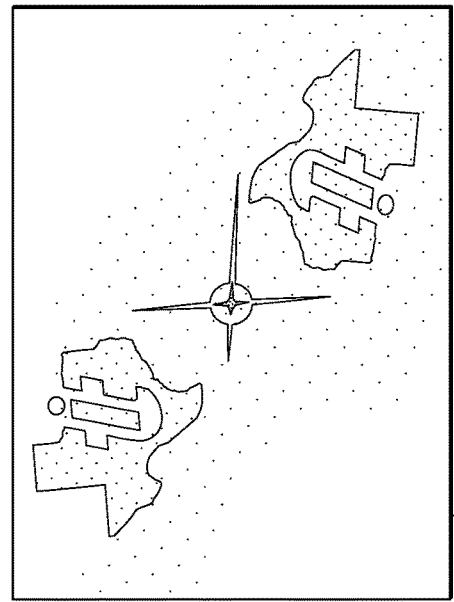
FIG. 7
FIG. 11

LIDAR WITH SPATIAL LIGHT MODULATOR

CROSS REFERENCE TO RELATED APPLICATIONS

This application is a continuation of U.S. patent application Ser. No. 15/202,315 filed Jul. 5, 2016, which claims priority to U.S. Provisional Patent Application Ser. No. 62/188,035, filed Jul. 2, 2015, the entireties of both of which are incorporated herein by reference.

BACKGROUND

This relates generally to light detection and ranging systems. The term "LIDAR" is a portmanteau of the words "light" and "radar" created to describe systems using light for ranging and depth imaging systems. More recently, the term (LIDAR or "lidar") forms an acronym for "Light Detection and Ranging." LIDAR systems form depth measurements and make distance measurements. In LIDAR systems, a source transmits light into a field of view and the light reflects from objects. Sensors receive the reflected light. In some LIDAR systems, a flash of light illuminates an entire scene. In the flash LIDAR systems, arrays of time-gated photodetectors receive reflections from objects illuminated by the light, and the time it takes for the reflections to arrive at various sensors in the array is determined. In an alternative approach, a scan such as a raster scan can illuminate a scene in a continuous scan fashion. A source transmits light or light pulses during the scan. Sensors that can also scan the pattern, or fixed sensors directed towards the field of view, receive reflective pulses from objects illuminated by the light. The light can be a scanned beam or moving spot. Time-of-flight computations can determine the distance from the transmitter to objects in the field of view that reflect the light. The time-of-flight computations can create distance and depth maps. The depth maps are displayed. Light scanning and LIDAR have been used in a variety of applications, including: ranging; metrology; mapping; surveying; navigation; microscopy; spectroscopy; object scanning; and in industrial applications.

Recently LIDAR applications also include security, robotics, industrial automation, and mobile systems. Vehicles use LIDAR navigation and collision avoidance systems. Autonomous vehicles and mobile robots use LIDAR.

In conventional mechanically scanned LIDAR systems, a rotating mirror or mirrors can cause a laser beam to scan the scene in the field of view. Sensors detect light reflected from objects in the field of view by backscattering. The fixed scan patterns result from mechanically rotating a laser or from mechanically rotating a mirror reflecting light from a laser or collimator fed by a laser. These conventional systems include a variety of mechanical components such as motors, rotors, and moving mirrors that have substantial power and weight requirements, require maintenance, and are subject to failure and require repair.

An example LIDAR application is autonomous vehicles. Current commercially available LIDAR systems for autonomous vehicle applications include many components and moving parts. Mechanical motors, rotators, and housing arranged for mounting the system on vehicle roofs are required. U.S. Pat. No. 7,969,558, issued Jun. 28, 2011, entitled "High Definition LIDAR System," assigned to Velodyne Acoustics, Inc., describes a vehicular system having eight assemblies of eight lasers each to form a sixty-four laser/detector assembly mounted on a vehicle rooftop. The lasers and detectors mount in a rotating housing that rotates at up to 20 Hz. Motors and rotating mechanical parts provide the high-speed rotation. Each of the eight assemblies includes multiple lasers and detectors. Such systems are high in cost, are mechanically and electrically complex, require special power and maintenance, and are physically large and affect the appearance of and the exterior surfaces of the vehicle.

SUMMARY

A spatial light modulator (SLM) has an array of pixels configured to modulate light in patterns responsive to first control signals. The modulated light forms at least one patterned light beam in a field of view. An illumination source is optically coupled to the SLM. The illumination source is configured to illuminate the array of pixels, responsive to second control signals. Circuitry is coupled to the SLM and to the illumination source. The circuitry is configured to provide the first control signals to the SLM and the second control signals to the illumination source. At least one detector is configured to detect a reflection of the patterned light beam in the field of view.

BRIEF DESCRIPTION OF THE DRAWINGS

FIG. 7 illustrates an example operation.

FIG. 11 illustrates an example of generating an image using diffraction.

DETAILED DESCRIPTION OF EXAMPLE EMBODIMENTS

Figure 1:
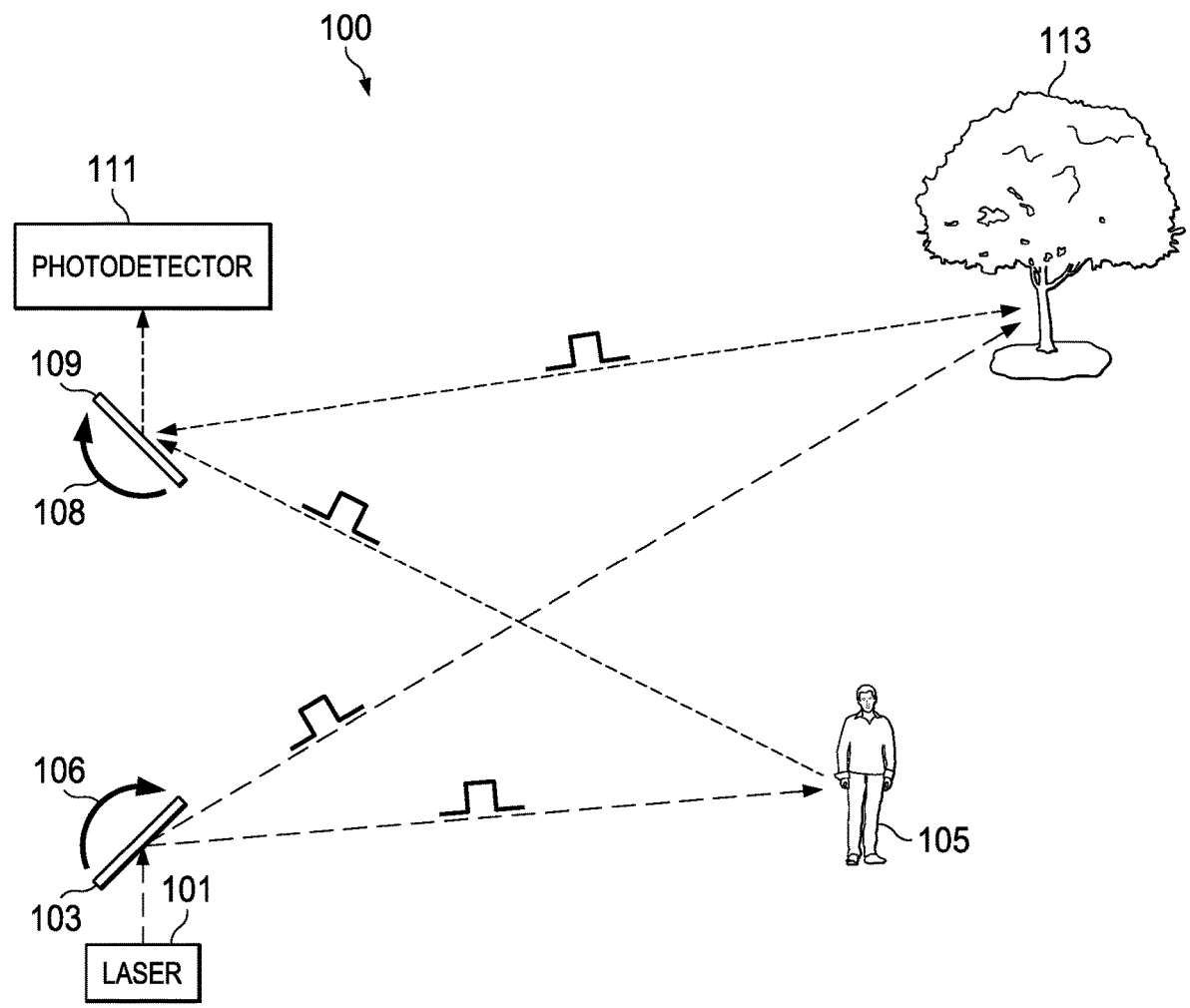
FIG. 1 illustrates a conventional LIDAR system.

Corresponding numerals and symbols in the drawings generally refer to corresponding parts unless otherwise indicated. The drawings are not necessarily drawn to scale.

The term "coupled" may also include connections made with intervening elements, and additional elements and various connections may exist between any elements that are "coupled."

Example embodiments provide ranging and/or depth measurement light detection systems using digital micromirror devices (DMDs). DMDs display diffraction patterns illuminated to provide scan patterns. Detectors sense the scan pattern light reflected from objects in the field of view. Time-of-flight calculations determine distance or depth information. Example embodiments include systems where diffractive patterns are displayed using the DMD. At least one coherent light source illuminates the DMD. The coherent light source can be a laser. The light can be pulsed. At a predetermined distance in the field of view of the system, an image such as a pattern, a spot or multiple spots form by interference of the light waves traveling from the DMD. Sensors detect reflections from the scan patterns that occur due to backscattering from objects. Distance to the objects can be determined using time-of-flight computations. In some alternative example arrangements, a flash illumination over an entire scene occurs, and then an array of photodetectors can integrate reflected light signals over time. A number of iterative or non-iterative algorithms can generate the diffractive images. In some of the algorithms, Fourier transforms simulate the desired far field image. In an example, inverse Fourier transforms can compute the diffraction patterns that are appropriate to form desired scanning patterns in the far field. After computing the complex inverse Fourier transform data, the system performs filtering of the data and quantizing of the complex inverse Fourier transform data. The system arranges binary data corresponding to the diffractive pattern for displaying the diffractive pattern using the DMD. In an example, a plurality of two dimensional diffraction pattern templates needed to form a desired scanning pattern are stored for retrieval. The patterns can include raster scanning patterns. In scanning the field of view, the diffractive pattern templates are displayed using the DMD in sequences designed to create the desired scanning pattern. In alternative examples, real time computing is used to compute the two dimensional DMD diffraction pattern data as needed. The real time computation outputs video data to display a scanning sequence using diffractive patterns on the digital micromirror device. In a scene adaptive example, the system resolution increases in the scanning pattern for a selected portion of the field of view with an object of interest. Using coarse resolution over a part of the scene with finer resolution for an area of interest in the scene improves performance. By leaving a portion of the scan pattern in a coarse resolution, processing time improves. By increasing resolution in an area of interest, system performance and resolution improves. Here the resolution can be defined by the number of individual beam positions covered during the scan or the divergence of the beams themselves.

FIG. 1 illustrates in a block diagram a conventional LIDAR system operation. In FIG. 1, system 100 includes a laser (or other light source) 101 arranged to illuminate a mirror 103. A rotating mount 106 rotates mirror 103 so that the laser beam movably travels across the field of view. In FIG. 1, a human FIG. 105 is in one part of the field of view, and a tree 113 is in another part of the field of view. The tree 113 and the human FIG. 105 are located at different distances from mirror 103.

When a pulse of laser energy enters the field of view from the surface of mirror 103, reflective pulses appear when the laser light illuminates an object in the field of view. These reflective pulses arrive at mirror 109 that can also movably rotate on a rotating mount 108. The reflective pulses reflect into a photodetector 111. The photodetector 111 can be any of a number of photodetector types; including avalanche photodiodes (APD), photocells, and/or other photodiode devices. Imaging sensors such as charge-coupled devices (CCDs) can be the photodetectors.

As shown in FIG. 1, the photodetector 111 receives reflective light pulses. Since the time the transmit pulses are transmitted from laser 101 onto mirror 103 is known, and because the light travels at a known speed, a time-of-flight computation can determine the distance of objects from the photodetector. A depth map can plot the distance information.

Figure 2:
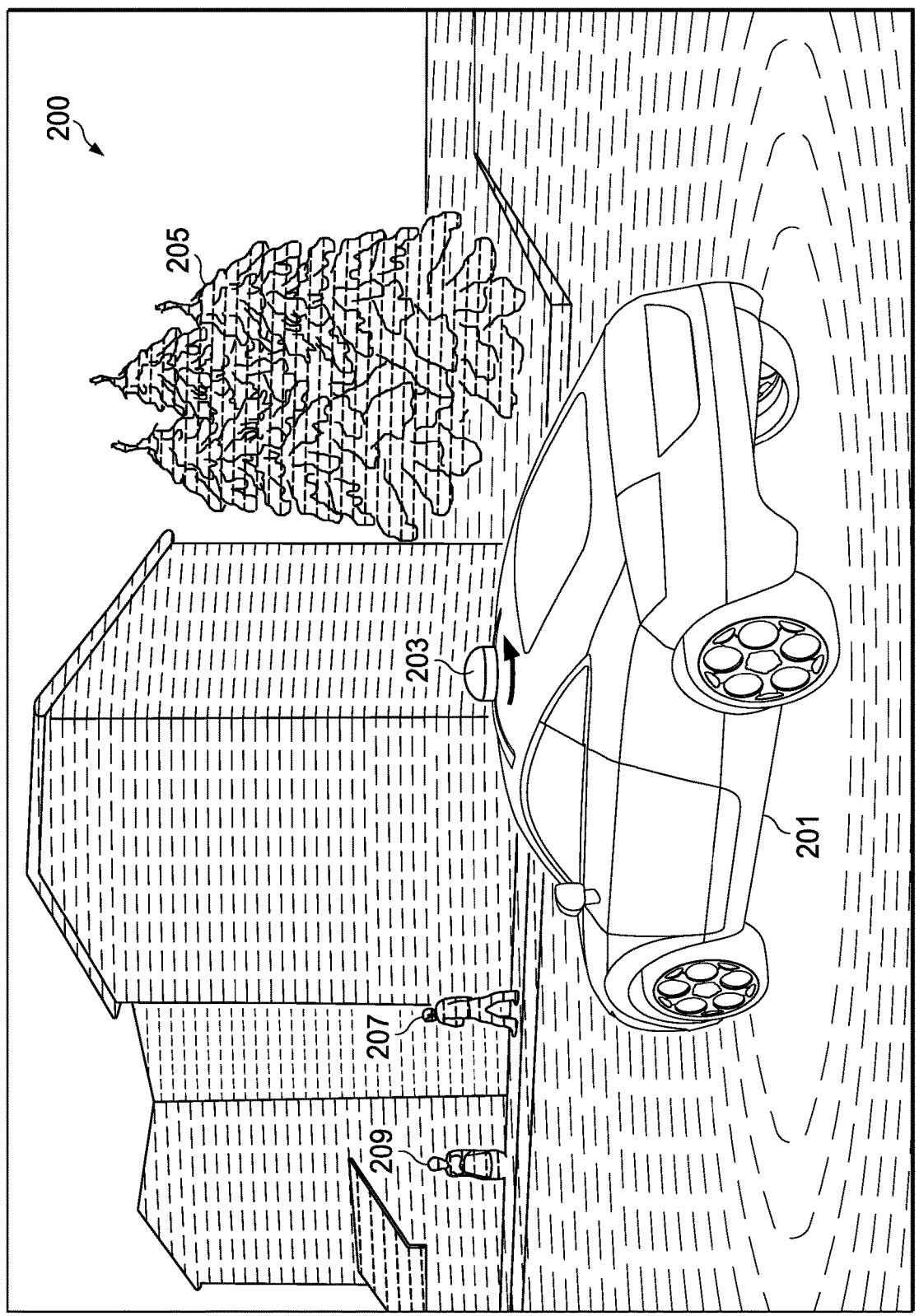
FIG. 2 illustrates a conventional LIDAR system in a vehicle application.

FIG. 2 illustrates in a block diagram an example vehicle mounted LIDAR system 200 such as in conventional autonomous vehicle applications. In FIG. 2, a car 201 includes a mechanically rotating LIDAR system 203 mounted on the rooftop of the vehicle. The rotating LIDAR system transmits laser pulses and measures reflections from objects around the system using time-of-flight calculations based on the speed of light. LIDAR systems for autonomous vehicles are available from Velodyne Lidar, Inc. An example system, the HDL-64, has sixty-four lasers arranged with corresponding detectors mounted in a rotating housing with a rotator motor that rotates the housing at up to 20 Hz. This system requires power to the motor, the many lasers, and the many detectors, as well as requiring substantial physical space on the roof of the vehicle.

Figure 3:
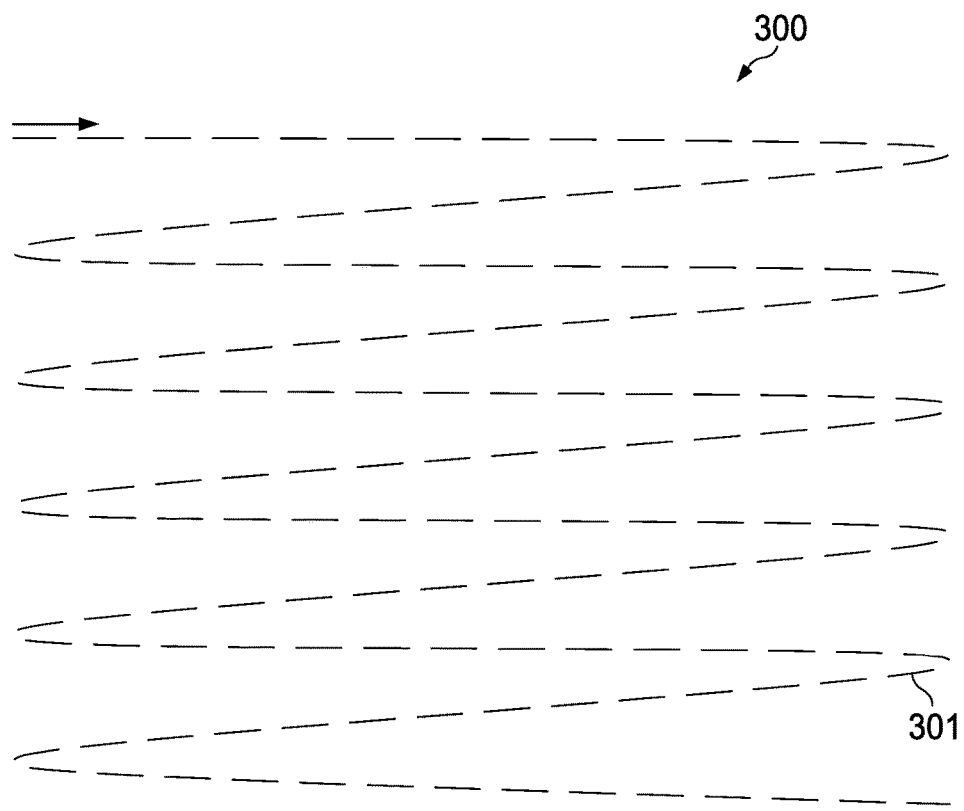
FIG. 3 illustrates a raster scan pattern.

FIG. 3 depicts in a simple diagram a representative pattern for scanning a scene using light. In the example of FIG. 3, a "raster" pattern shown by line 301 proceeds horizontally along a line position from one side of a field of view to the opposing side. The raster pattern returns to scan across the scene at another horizontal position vertically displaced from the first row. The pattern 300 shown in FIG. 3 illustrates a common scanning pattern for a single spot or beam. However, the various embodiments can use any number of alternative scanning patterns.

An important technology for light processing is DLP® technology from Texas Instruments Incorporated. TI DLP® home and cinema projectors, televisions, and sensors are in widespread use. These systems use one or more spatial light modulators having digital micromirror devices (DMDs), a reflective spatial light modulator technology developed by Texas Instruments Incorporated. In a DMD, a two dimensional array of mirrors is formed over a hinged torsional tilting mechanism. Electrical signals control the torsion to tilt the mirrors. The mirrors each have a corresponding data storage unit that are each individually addressable, and each micromirror can be switched between two states many thousands of times per second. DMD devices available from Texas Instruments can include many thousands and even millions of the micromirrors and can support various video resolutions. DMDs are reliable and robust especially as a diffractive beam scanner, because even if substantial portions of the micromirrors become inoperable, the high number and small size of the digital micromirrors provide inherent redundancy. DMDs have proven to be highly reliable, long life, solid-state devices for processing light. Because a DMD reflects light and each micromirror has an ON state and an OFF state, the DMD acts as a binary amplitude modulator.

Figure 4:
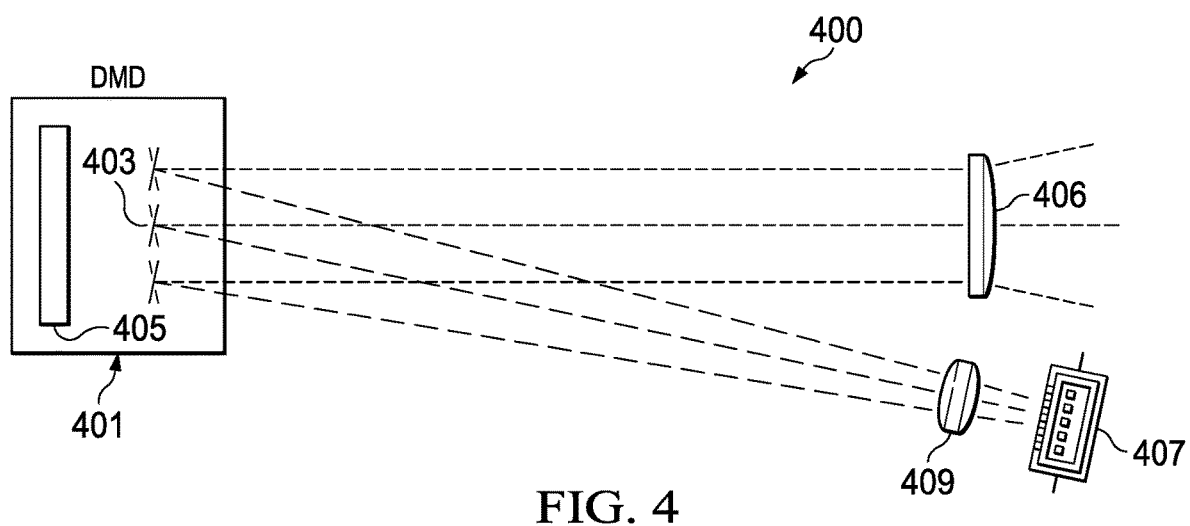
FIG. 4 illustrates a conventional projection system using a DMD.

FIG. 4 depicts in a simplified block diagram a DMD used in a conventional image projector system. In system 400, a single light source 407 and illumination optics 409 direct light from the light source onto the face of a DMD 401. Some systems use multiple light sources such as red, green and blue light sources. Some color light systems use color wheels to create colored light from a single light source. Some systems use multiple DMDs. DMDs such as DMD 401 are manufactured using micro-electromechanical system (MEMS) technology based in part on semiconductor device processing. An array of micromirrors 403 is disposed over a semiconductor substrate 405. In an example, the micromirrors include aluminum faces and are each mounted on a hinged torsion mechanism. The micromirrors 403 attach to a torsion hinge and can be tilted using electronic signals applied to electrodes that control a tilt by applying torsion to pivot the micromirrors about an axis. In an example DMD device, a two dimensional array of thousands or perhaps millions of the micromirrors form a WGA, XGA, 720p, 1080p or higher resolution imaging device. The micromirrors 403 reflect illumination light from the illumination optics 409 to a projection lens 406. A beam of light projects from the system 400. By displaying an image using the DMD and illuminating the DMD micromirrors, the reflected beam of light can include an image for display on a surface such as a screen or wall. The micromirrors 403 are individually addressable, and each has an associated storage memory cell that determines the state of the micromirror during an active illumination period.

The micromirrors 403 each have three individual states: a first "ON" state; a second "OFF" state; and a third "FLAT" state. In the ON state, the micromirrors 403 in FIG. 4 tilt in a first position away from the FLAT position. The tilt occurs due to signals on an electrode that cause the torsion hinges to flex. In system 400, the micromirrors 403 in the ON state reflect incoming light from illumination optics 409 outwards to the projection lens 406. In the OFF state, the micromirrors 403 tilt to a different position. In this example arrangement, mirrors in the OFF state reflect the light away from the projection lens 406. In some arrangements, the OFF state light reflects to a "light dump" (not shown) or thermal energy collector. By varying the tilt positions using electrical control signals, each of the micromirrors 403 can direct reflected light to the projection lens 406. The FLAT state is the position the micromirrors take when no power is applied to the DMD and is currently not used for any application. In at least one example, the FLAT position is 0 degrees, and a DMD from Texas Instruments Incorporated has an ON state tilt of about +12 degrees and an OFF state tilt of about −12 degrees. Other DMD devices provide different tilt angles, such as +/−10 degrees, or +/−17 degrees.

Figure 5B:
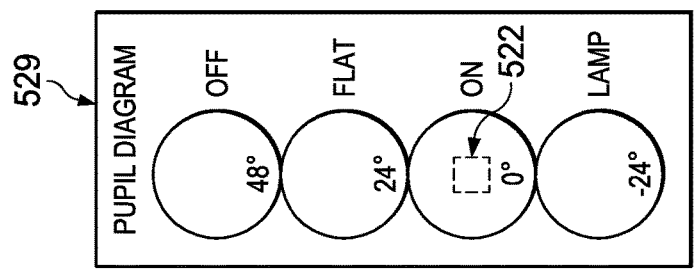
FIGS. 5A and 5B illustrate operations of a digital micromirror in a projection system and a corresponding pupil diagram.
Figure 5A:
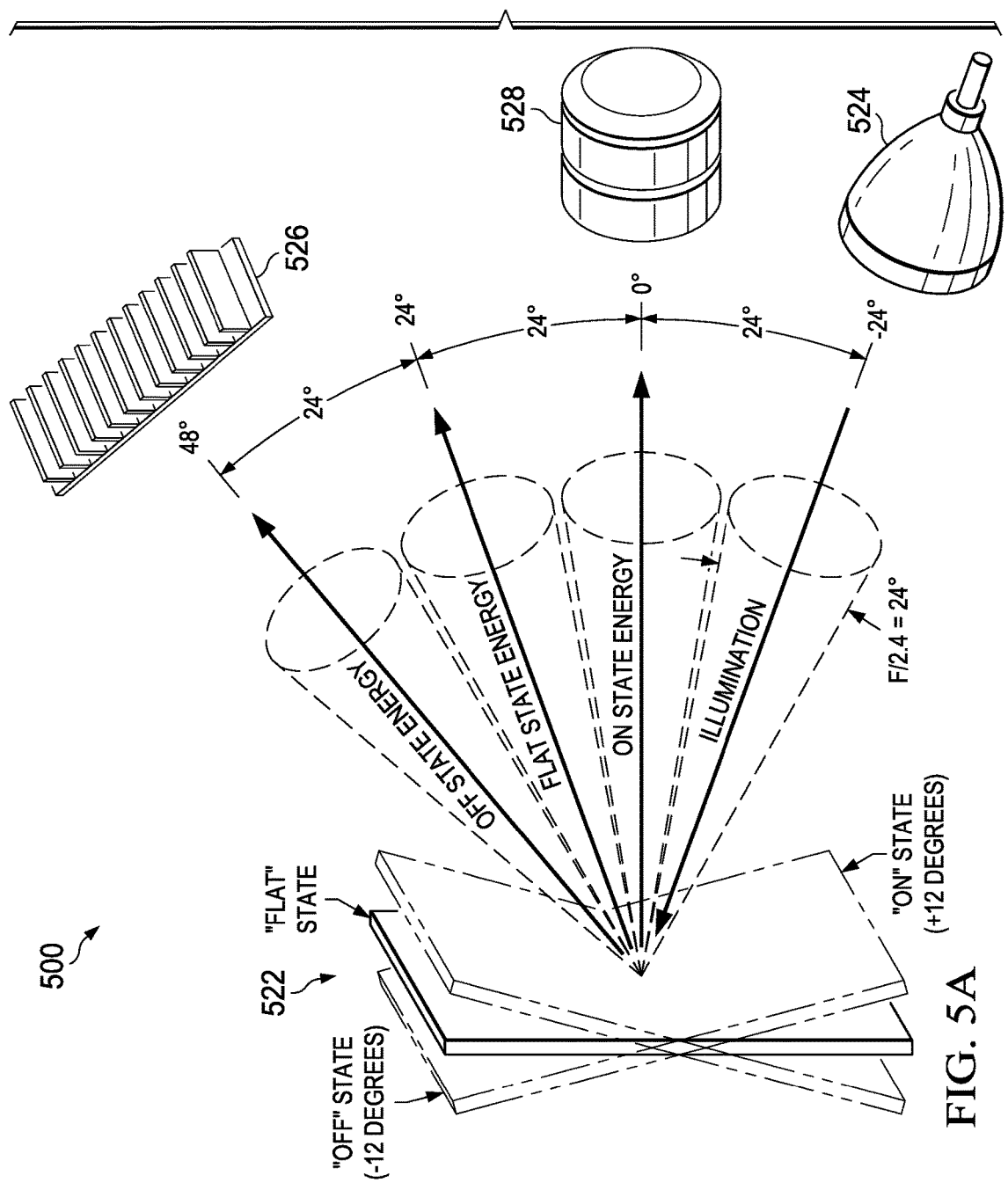

FIGS. 5A and 5B further illustrate the operation of a micromirror in a conventional projector incorporating a DMD as a spatial light modulator. In FIG. 5A, projection system 500 incorporates a single illustrative micromirror 522. In the actual projector device, the DMD will have thousands or millions of micromirrors arranged in a two dimensional array. FIG. 5A illustrates the various positions of the micromirror 522. In the ON state, the micromirror 522 is at a first tilted position considered ON, such as +12 degrees from the vertical or FLAT position. The illumination source 524 is at an angle of −24 degrees from the zero degree (with respect to the vertical) position, so that the zero degree angle is aligned with the projection lens 528. When reflecting from the surface of a mirror, the angle of incidence (AOI) of the incoming light is equal to the angle of reflection (AOR) of the reflected light; therefore, for a +12 degree tilt, the −24 degree angle for the illumination source results in reflected light at the zero degree position, as shown in FIG. 5A. The cone of reflected light ON STATE ENERGY shows the reflected light directed outwards from the micromirror 522 at the zero degree position. When the micromirror 522 is in the ON state, the light from the illumination source 524 reflects as the cone of light labeled ON STATE ENERGY at zero degrees into the projection lens 528. The projected light projects from the projection system 500. The micromirror 522 is in a FLAT state when the DMD is unpowered. When the micromirrors are in the FLAT state in a video projection system, the illumination source is also usually unpowered. The micromirror 522 can tilt to an OFF state. In the OFF state position, the micromirror 522 is at a second tilt position at an angle of −12 degrees from the FLAT position. In the OFF state, the illumination light that strikes the micromirror reflects away from the projection lens 528, and is output into a light dump 526. Light dump 526 can be a heat sink that dissipates heat from the light. In this example, when the micromirror 522 is in the OFF state, the reflected light does not exit the projection system.

In conventional projection systems, the FLAT state of the micromirror 522 is not used when the DMD is active. All of the DMD micromirrors move to the FLAT state when the DMD device powers off. The FLAT position is a "parked" or "safe" position for the micromirror 522.

FIG. 5B illustrates a pupil diagram 529 for the projection system 500, including the pupil positions for the three mirror states (OFF, FLAT, ON) and the pupil position of the light source (LAMP). The pupil diagram 529 shows the approximate position of micromirror 522 (FIG. 5A) centered in the ON state pupil. In pupil diagram 529, the illumination source for a conventional projector is at pupil position LAMP. The ON pupil position is adjacent and above the LAMP pupil position. The FLAT pupil position is adjacent and above the LAMP pupil position, and the OFF pupil position is adjacent and above the FLAT pupil position. As illustrated in the pupil diagram, the positions of the pupils center on a vertical line due to the micromirror having a single action hinge. This type of DMD is commercially available and sold by Texas Instruments Incorporated. For example, the Texas Instruments Incorporated device DLP3000 has an array of 608×684 micrometer sized mirrors, equating to more than 400,000 micromirrors. The DLP3000 is one example DMD but many different DMD devices are available from Texas Instruments Incorporated.

Figure 6A:
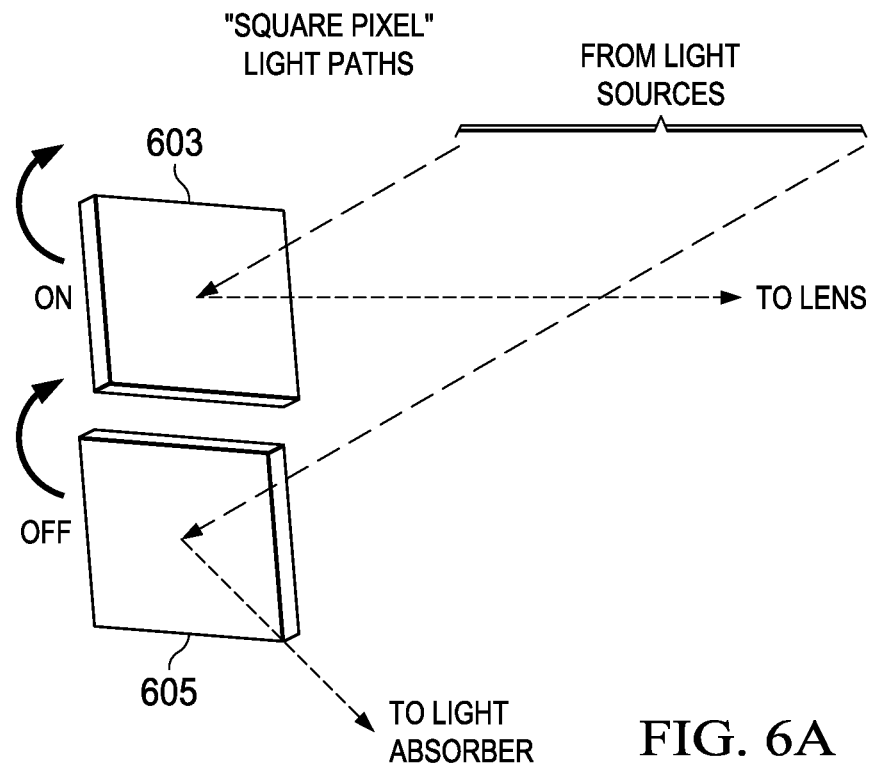
FIGS. 6A and 6B illustrate two different mirror orientations.
Figure 6B:
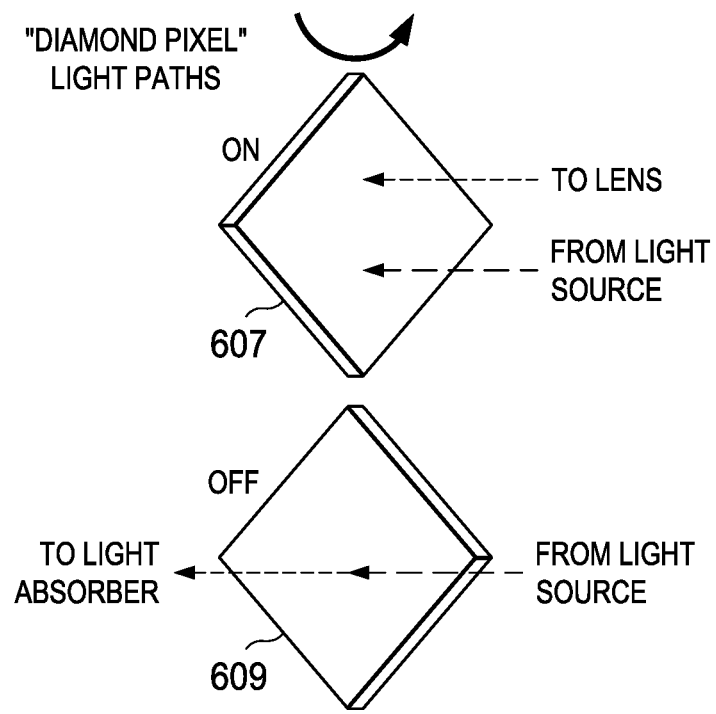

DMDs can vary in mirror size, array size, tilt angle, and mirror orientation. FIGS. 6A and 6B illustrate two different mirror orientations. In the DMD shown in FIG. 6A, the mirrors or pixels are oriented in the "Manhattan" or "square pixel" fashion with the edges aligned vertically with column spaces between the mirrors, and edges aligned horizontally with row spaces between mirrors. As shown in FIG. 6A, the tilt angle for the two example mirrors 603, 605 in this orientation is on the diagonal. This results in an "off axis" requirement for the light source in a projector. The illumination light (labeled "From Light Source") has to come from a point above (or below) the micromirror array and has to be angled with respect to it. In designing a system around the DMD of FIG. 6A, the housing has to have some vertical spacing above (or below) the DMD device as well as horizontal spacing for projection optics in front of the DMD arranged to project the image from the DMD. In FIG. 6A, when the mirrors are in the ON state the light reflects toward a lens; in contrast, when the mirrors are in the OFF state the light reflects away from the lens to a light absorber.

In FIG. 6B, a two adjacent mirrors in a diamond pixel mirror array are illustrated. Recent DMD devices released by Texas Instruments Incorporated provide two dimensional micromirror arrays with the diamond orientation. In this orientation, the mirrors tilt ON and OFF around a vertical axis, and the edges are arranged diagonally with respect to columns and rows. Because the tilt angles for ON and OFF states are symmetric about a vertical axis, the illumination source and the DMD can be in the same horizontal plane. The illumination source no longer has to be placed above or below the DMD ("off axis.") In the ON state, the light enters the DMD from the side and reflects forward from the DMD to a lens. In the OFF state, the light reflects to the opposite side to a light absorber. All of the light paths are in the same horizontal plane. This aspect of the diamond DMD allows for a more compact system as the light source is in the same plane, horizontally, as the DMD and the projection lens. Compact projectors, such as handheld portable projectors and pico projectors for incorporation in other portable devices such as tablets and mobile phones, can use the diamond pixel DMDs. Additional signal processing maps the pixel data for an image frame onto the diamond DMDs but this signal processing is compatible with the type of processors typically used in digital light processing systems that use DMDs.

In addition to the DMDs described herein above, Texas Instruments Incorporated also offers DMDs with a complex tilt mechanism described as "tilt and roll pixel" or TRP. The example embodiments can also use these TRP DMDs. TRP DMDs feature a tilt angle of +/−17 degrees. Illumination can begin on one side, with the ON state output in front of the DMD and with the OFF state being below or above the DMD. A commercially available part DLP3114 manufactured by Texas Instruments Incorporated is an example of a TRP DMD device that can be used in the various embodiments In projection systems using a DMD, illumination optics provide a cone of light onto the DMD while the mirrors tilt "on" or "off" to provide the image to be displayed. Projection optics then focus that image onto a surface for display. Various display systems use DMDs as projectors. Applications include: theatre and conference room projectors that display on a wall or screen; rear projection televisions that project onto a display screen; home projectors; sales or presentation projectors; hand held and pico-projectors; heads up displays for aviation, marine and automotive applications; virtual reality and wearable goggles; personal video players displays; and smart glasses displays. Each of these applications uses the DMD as a reflective spatial light modulator.

The two-dimensional array of micromirrors in a DMD can act as a diffraction grating. The pitch of the DMD devices varies from a few microns to about fourteen microns. The pitch of these devices is small enough, when compared to the wavelengths of coherent light sources such as lasers, to exhibit significant diffraction. In projection systems, the diffraction effects are not desirable and these effects are minimized by optical design.

In the example embodiments, a DMD displays a diffractive pattern, and does not display a projection image. Diffraction changes the direction and distribution of light due to traversing apertures such as an opening or slit. The DMD mirrors and the spaces between the DMD mirrors provide a natural diffraction grating. Further, diffractive patterns displayed using the DMD can create desired patterns in a far field image plane. These patterns result from interference between wavefronts of light traveling away from the diffractive pattern on the DMD. The image patterns in the far field can be almost unlimited in variety. A single DMD and a single illumination source can form many patterns in the far field image plane.

To illustrate the diffractive characteristic of a DMD, FIG. 7 illustrates in a block diagram a far field image result obtained by illuminating an entire DMD micromirror array with a laser illumination source. In FIG. 7, a system 700 operates by directing the output of a laser 705 onto the mirror surfaces of DMD 703. Afocal lenses 707 and 708 collect the output light and provides an afocal lens correction to illuminate a larger field of view than can be illuminated in a "lens less" system. However, the use of the afocal lenses 707 and 708 is not required, and in alternative embodiments, the system can be "lens less." The far field image shown as 709 in FIG. 7 is a pattern of spots with a brighter spot in the center, and the pattern of spots symmetrically surrounds the center spot. The pattern 709 illustrates that the DMD is acting as a diffraction grating for the illuminating laser.

An embodiment system can use the diffraction properties of the laser and the DMD to form arbitrary patterns at the far field image plane. For example, a pattern of spots can form as shown in FIG. 7. Further, by displaying a particular diffraction pattern using the DMD, the locations of the spots can be any arbitrary position in the field of view of the system. Because the DMD can rapidly switch between different diffractive patterns, a sequence of patterns can be displayed using the DMD, with each diffraction pattern being illuminated by the laser. By continuing to display different patterns in the sequence, a scanning pattern or moving spot pattern forms at the far field. In this example system, the DMD is acting as a hologram display. The hologram pattern can cause a beam or beams. The beams can result in reflections from objects located at distances from a few centimeters to one hundred meters or up to several hundred meters from the DMD and illumination source.

Because the patterns are hologram or diffraction patterns and not recognizable images, focused optical elements are not required in the embodiments. However, as described hereinabove the embodiments can include afocal lens elements to expand the field of view covered by the light pattern. Range of the system can be between a few centimeters to several hundred meters. A rapidly pulsing laser can illuminate the DMD. The laser can be at low power levels and with short pulse durations that are "eye safe" so that a viewer will not suffer eye damage if the laser light strikes an observer's eye. The system can use infrared and other illumination frequencies.

Figure 8A:
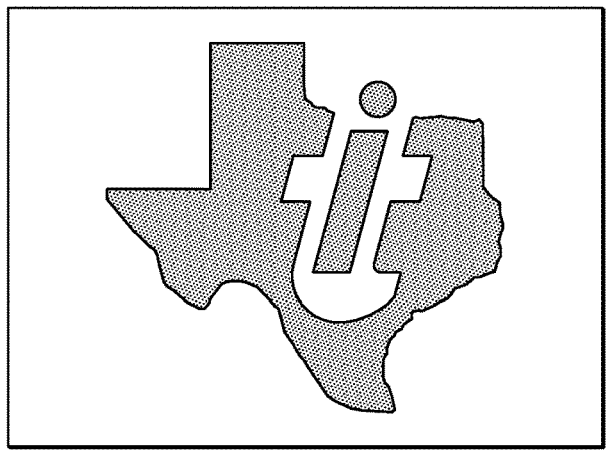
FIGS. 8A, 8B and 8C illustrate an image pattern, a corresponding diffraction pattern, and a corresponding image formed using the diffraction pattern, respectively.
Figure 8B:
Figure 8C:
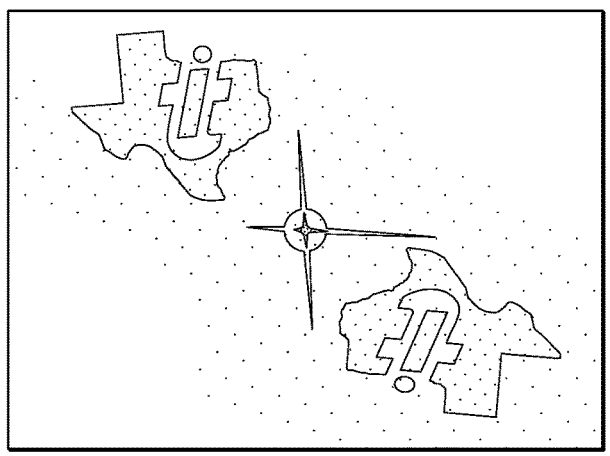

An example system using a DMD as a diffraction pattern generator or hologram display device is described in a paper entitled "Digital micro mirror device as a diffractive reconfigurable optical switch for telecommunication," by Blanche et. al., Journal of Micro/Nanolithography, MEMS and MOEMS, Vol. 13 (1), January-March 2014, pp. 011104-01-011104-05, (hereinafter, "Blanche et. al.") which is hereby incorporated by reference in its entirety. In Blanche et. al., the authors demonstrate that a diffraction pattern on a DMD can produce an image at a desired point in an image plane. In an example system described in Blanche et. al., spot patterns input data to optical fibers in an optical switch. FIG. 8A shows an example desired pattern described in Blanche et. al., a logo of Texas Instruments Incorporated, known as the "TI bug." In FIG. 8B the DMD pattern needed for producing the image by diffraction is illustrated as it would be displayed using a two dimensional DMD array. Note that the pattern in FIG. 8B is not a visible image of the logo and it is clear from FIG. 8B that the DMD is not projecting images in a conventional manner. FIG. 8C is an illustration showing the resulting holographic image that results from a laser illumination of the DMD array of FIG. 8B. Note that a bright spot due to the zero order energy, analogous to a DC component of an electronic signal, appears positioned at the center of the image. This zero order component will be present for each diffraction pattern because of the fact that the DMD can only modulate light intensity and not phase. At the upper left of FIG. 8C is the first order component, which reproduces the desired image. The resulting image also has a second first order component image at the lower right portion of FIG. The conjugate first order image is flipped about the zero order spot. Each image formed using a diffraction pattern will also have a conjugate image and a zero order spot.

As can be seen from the diffractive pattern shown in FIG. 8B, the diffraction or hologram imaging system is not projecting an image through the DMD array using conventional optical projection. The pattern at the far field image plane and the diffraction pattern displayed using the DMD can be related mathematically by a Fourier transform. When illuminated by a coherent source the diffraction pattern produces wavefronts that interfere constructively and destructively corresponding to the diffracted light. The desired image appears at a plane some distance from the DMD. In the embodiments, a variety of diffraction patterns can display on a DMD array in a sequence to form arbitrary and desired scan patterns at some distance.

The relationship between the diffraction pattern on the DMD and the resulting pattern at a position in the field of view can be described in terms of a two dimensional Fourier transform. Because the diffraction pattern and the resulting image at the far field plane are related by a two-dimensional Fourier transform, in the embodiments where a scan pattern is needed, algorithms for generating these diffractive patterns typically use Fourier transforms.

Some fast algorithms for generating diffractive patterns or holograms for display on a DMD are described in a paper entitled "Fast algorithms for generating binary holograms," authored by Stuart et al., arXiv:1409.1841[physics.optics], 5 Sep. 2014, (hereinafter, "Stuart et. al.") which is hereby incorporated by reference herein in its entirety. In Stuart et. al., the fast algorithms include an ordered dithering algorithm and a weighted Gerchberg-Saxton algorithm. The embodiments can use additional algorithms to develop diffraction patterns. An example algorithm includes identifying a far field image pattern to be created in the field of view; zero padding the image pattern; and taking the inverse Fourier transform of the zero padded pattern using a fast Fourier transform. The method continues by quantizing the resulting complex IFFT data to get a binary pattern for display using the DMD, and subsampling the binary pattern to arrange it for the particular DMD mirror orientation. By simulating the far field image using FFTs, and observing the resulting far field image, recursive improvements can adjust the diffraction pattern until the desired far field image results. These recursive improvements can compensate for device specific variations in mirror alignment and flatness, for example, to obtain the correct far field image without modifying the DMD.

Figure 9:
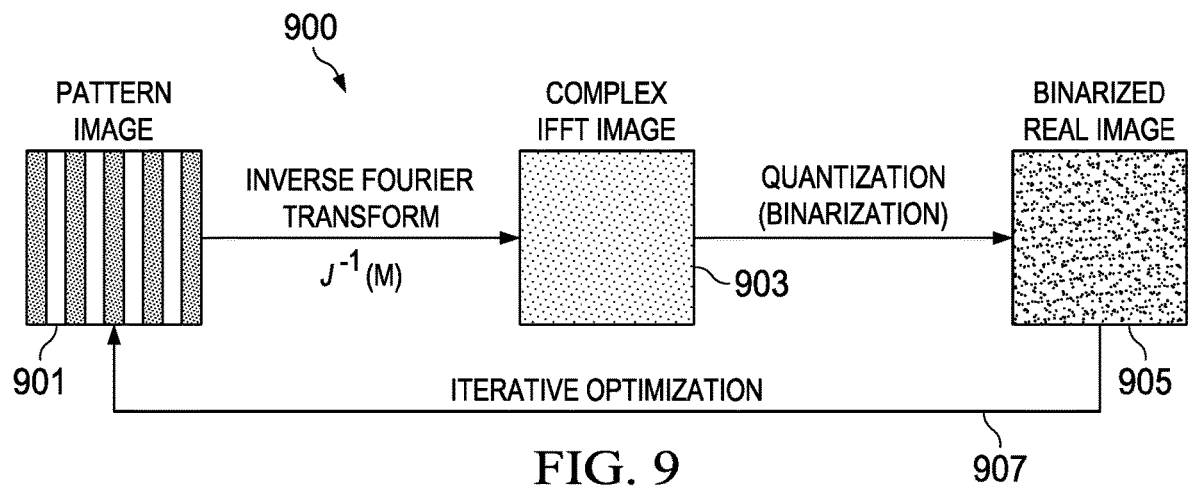
FIG. 9 illustrates a method of computing a binary diffraction pattern.

FIG. 9 depicts in a block diagram 900 the operation of an example method for forming diffractive patterns for display using the DMD. FIG. 9 shows a desired pattern for a far field image, "Pattern Image" 901. One simple method of creating a DMD pattern that produces the desired far field image 901 is to apply an inverse fast Fourier transform (IFFT) to the image. To compute the IFFT efficiently, various computing techniques can be used, such as a discrete fast Fourier transforms, or DFFT. Processors optimized for DFFT computations, such as co-processors, digital signal processors, and vector processors can compute the inverse DFFT. As shown in FIG. 9, the result is a two-dimensional array labeled "Complex IFFT Image" 903. The Complex IFFT Image 903 has no visible relationship to the Pattern Image 901. The Complex IFFT image includes components that are not of binary values. To form a corresponding diffractive pattern for display using the DMD, which is a binary amplitude modulator with the binary states ON and OFF, the system performs additional processing. This processing can include quantization or binarization of the Complex IFFT Image 903 to allow it to display on the binary DMD. Several methods can be used to create a binary diffractive image that produces a desired far field image, such as methods described by Stuart et. al., described hereinabove. In addition, the system maps the quantized diffraction pattern data to match the data to the selected orientation type of DMD. If the DMD is a square pixel or "Manhattan" mirror orientation, the system performs one type of mapping. If the DMD is a diamond pixel orientation DMD, the system performs a different mapping to map that data onto the DMD. In the embodiments, the methods compute a diffraction pattern for display using the DMD that will produce the desired far field image.

Iterative optimization steps can better match the far field image to the desired image. In an example embodiment, the Gerchberg-Saxton algorithm can be used as an iterative algorithm. FIG. 9 illustrates the optimization process by the "Iterative Optimization" path 907. This iterative process can continue for each desired pattern to obtain a corresponding diffractive pattern for display using the DMD.

Because the diffraction pattern is a two-dimensional data array for display using the DMD, the patterns can be stored in memory as diffraction pattern templates. Additional patterns can be stored in memory in a system for retrieval and display. The processing needed to compute the diffraction patterns using the inverse Fourier transform can be "offline" or performed during a system calibration process, and it is not necessary to design a system that can compute these diffraction patterns in real time or in the field. However, in an alternative example, real time processing can compute the diffractive patterns, and this approach avoids storing all of the possible diffractive patterns needed in a memory.

Figure 10:
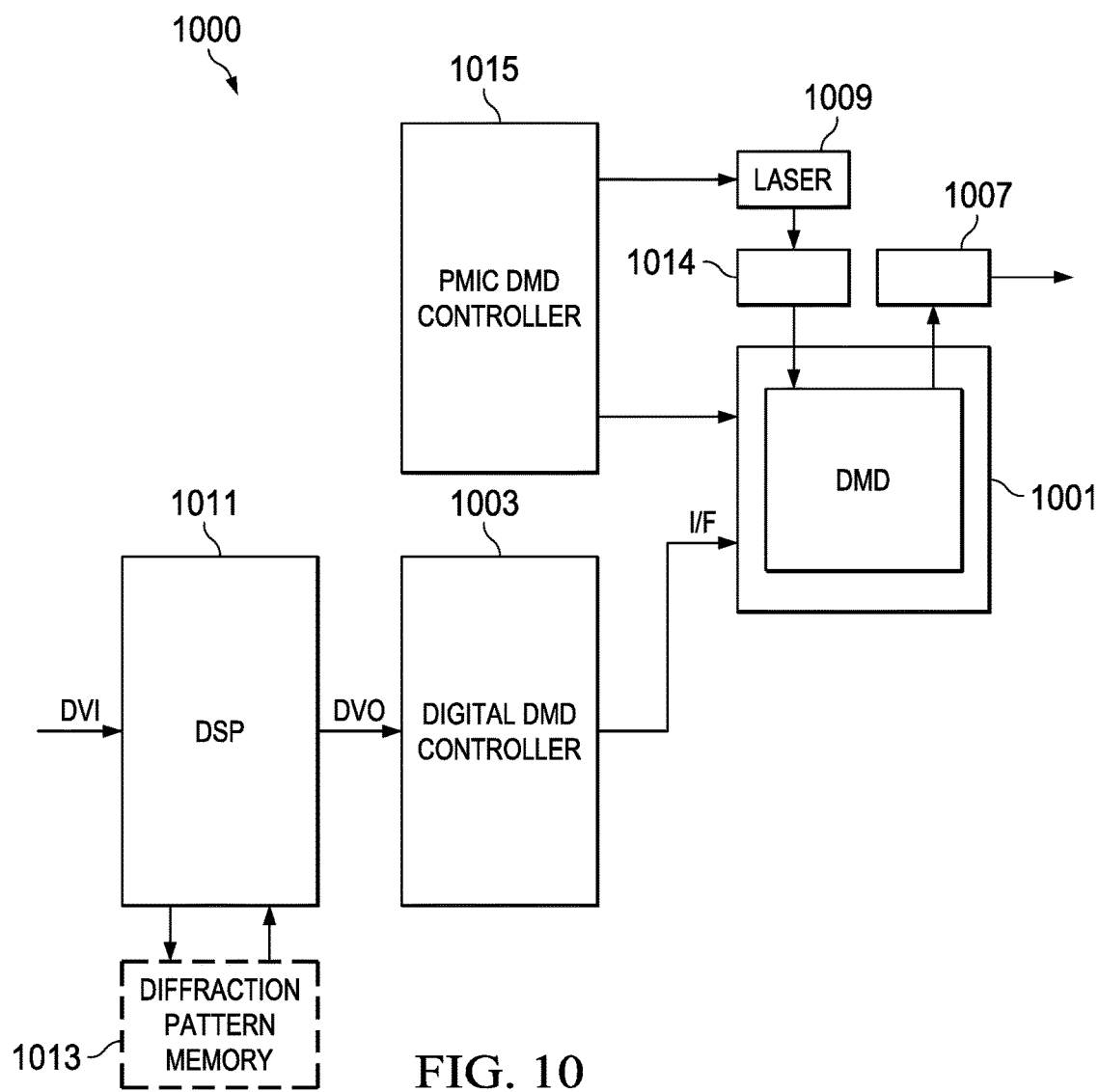
FIG. 10 is a block diagram of a system of example embodiments.

FIG. 10 depicts in a simple circuit block diagram a typical arrangement 1000 for use with the embodiments. A microprocessor, mixed signal processor, digital signal processor, microcontroller or other programmable device 1011 executes instructions that cause it to output digital video signals DVO for display. A variety of sources may provide the digital video signals labeled DVI in the figure. In the embodiments, a system can perform the inverse Fourier transforms described hereinabove to produce the DVI data needed for diffractive patterns in real time. In an alternative arrangement, the DVI data can come from stored diffraction pattern templates computed before operation of the system, or in a calibration operation during manufacture of the system. FIG. 10 shows an optional memory 1013 for storing diffraction patterns coupled to DSP 1011. Dynamic memory (DRAM), static random access memory (SRAM), non-volatile read write memory such as EEPROM, FLASH, EPROM and other data memory types can be used to store the diffraction patterns. The processor 1011 couples to a digital DMD controller circuit 1003. Digital DMD controller circuit 1003 is another digital video processing integrated circuit. In an example, digital DMD controller circuit 1003 is a customized integrated circuit or an application specific integrated circuit (ASIC). FIG. 10 shows an analog circuit that manages power and LED illumination referred to as the "power management integrated circuit" (PMIC) 1015. PMIC 1015 controls the intensity and power to the coherent light source laser 1009. The DMD controller circuit 1003 provides digital data to the DMD 1001 for modulating the illumination light that strikes the DMD surface. PMIC 1015 provides power and analog signals to the DMD 1001. The light rays from the illumination source 1009 travel to illumination components in block 1014. The light strikes the reflective mirrors inside DMD 1001. The reflected light for projection leaves the surface of the DMD 1001 and travels into the optional optics 1007 that operate to transmit the diffracted light as described hereinabove. Together the integrated circuits 1011, 1003 and 1015 cause the DMD 1001 and the optical components 1014, 1007 to output the diffracted light.

Example integrated circuits that can implement the circuit shown in FIG. 10 include DMD controller ICs from Texas Instruments Incorporated. DMD controller ICs include, for example, the DLPC3430 DMD controller, and the DLPC2601 ASIC device that can provide both digital and analog controller functions. Analog DMD controller devices from Texas Instruments, Incorporated include the DLPA2000 device. Laser controller devices can power on and off the laser 1009 or form pulses.

The DMD of FIG. 10 can be a DMD device from Texas Instruments Incorporated such as the DLP2010DMD, which is a 0.2-inch diagonal device that provides wide VGA (WVGA) resolution. The embodiments can use many other DMD devices that are available from Texas Instruments Incorporated.

FIG. 11 depicts an operation using a system 1100 to illustrate the use of diffraction patterns displayed on a DMD to create a particular desired pattern. In FIG. 11, the components are similar to those shown in FIG. 7, and similar reference labels are used. For example, the DMD in FIG. 11 is 1103, similar to the DMD 703 in FIG. 7. In this illustrative example, the system 1100 creates a pattern in a far field image plane corresponding to the Texas Instruments logo. A processor, not shown for simplicity, controls the laser and the DMD. The laser 1105 illuminates the DMD 1103. DMD 1103 has a diffraction pattern loaded into the DMD array. The pattern diffracts the light and the light waves leaving the DMD surface travel through an afocal lens 1107 that expands the light to enlarge the field of view. Afocal lenses 1107, 1108 are optional. At a desired distance in the far field of view, the pattern 1109 appears. This visible pattern is an interference pattern, so the pattern did not result from projecting an image using the DMD.

By sensing reflections from objects illuminated by the interference pattern, an embodiment system can detect objects at a variety of distances from the source, from a few centimeters to one hundred or even several hundred meters. Unlike a projection system with a focused image distance, the system 1100 can form arbitrary patterns at a variety of distances without the use of complex moving optical elements. In the embodiments, the diffraction patterns displayed at the DMD can be changed and illuminated in a sequence to create a scan pattern at different points in the field of view.

Figure 12:
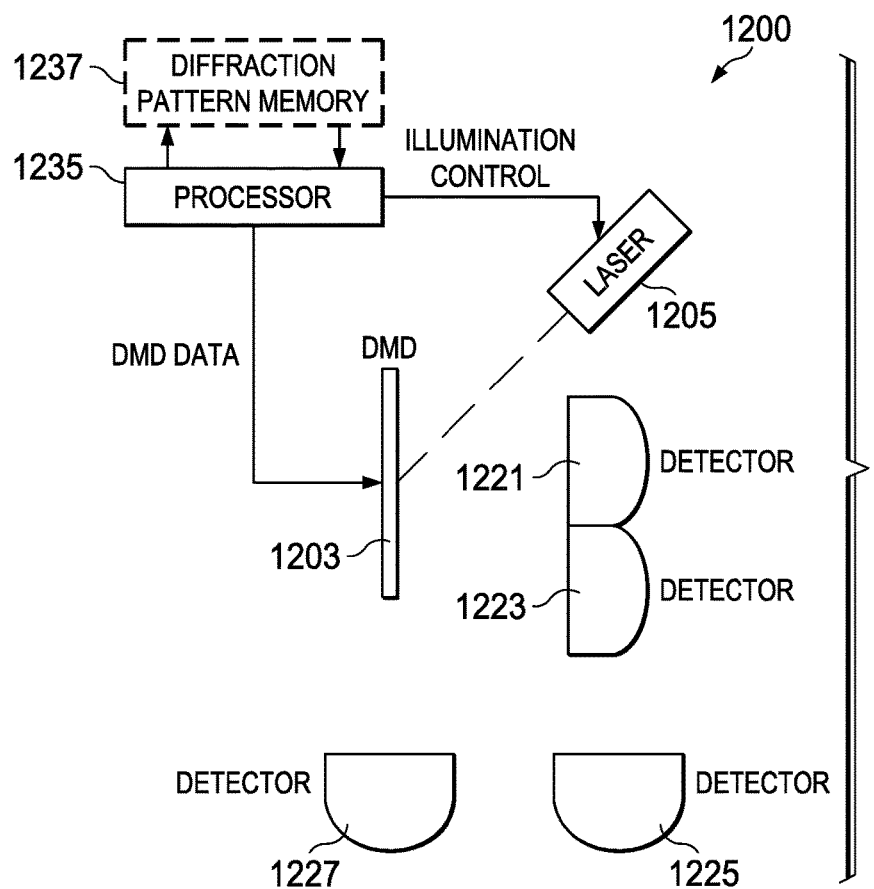
FIG. 12 is another block diagram of a system of example embodiments.

FIG. 12 depicts in a top view a block diagram for an example system 1200. In FIG. 12, a laser or other illumination source 1205 fully illuminates an array of micromirrors on DMD 1203. The angle of the beam from the laser to the DMD is determined by the tilt angles of the DMD chosen for the embodiment and by the desired path leaving the DMD surface. The DMD 1203 can be any DMD device. At least one detector senses reflected light. Objects in the field of view illuminated by the scan pattern reflect the light back to the detector. This example uses multiple detectors 1221, 1223, 1225, and 1227. Alternative examples use more or fewer detectors. The detectors can receive reflections caused by different parts of the scan pattern. In an alternative embodiment, a single detector can scan different portions of the field of view and sense reflections due to different patterns. A single detector can capture reflections from different parts of the scan pattern with time division. The detectors are photodetectors that can be any photosensitive device as described hereinabove. A processor 1235 provides data to the DMD and controls the laser 1205. The processor 1235 can include multiple custom or commercially available integrated circuits as described hereinabove to control the data displayed using the DMD and the laser pulses that illuminate the DMD. An optional storage for diffraction patterns couples to the processor 1235, the "Diffraction pattern memory" 1237, and stores two-dimensional arrays for displaying diffraction patterns using the DMD.

Figure 13:
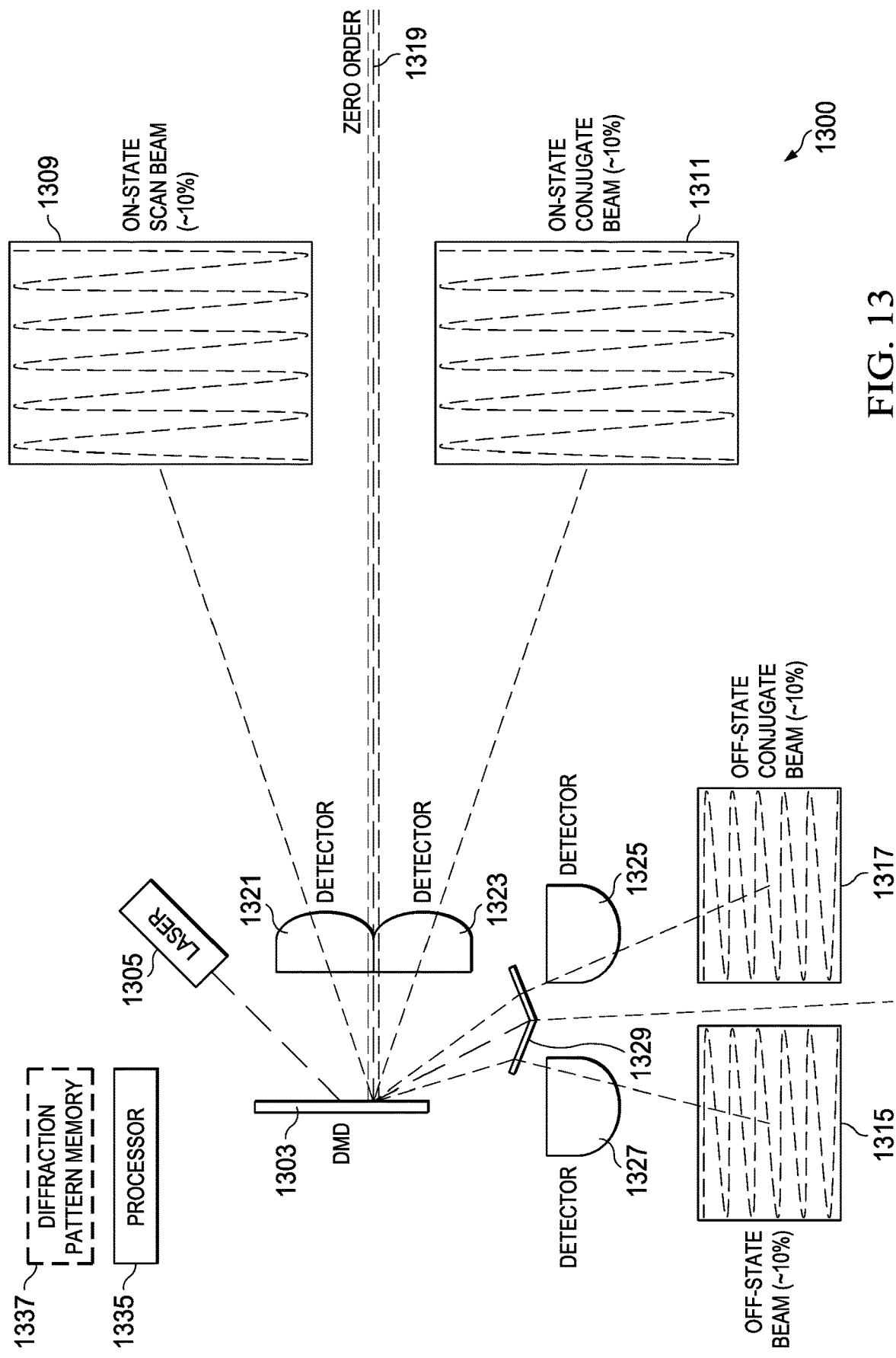
FIG. 13 is a block diagram of the system of FIG. 12 in a scan operation.

FIG. 13 depicts in another top view diagram a system 1300 similar to the system 1200 in FIG. 12, now shown in a scan operation. For ease of comprehension, FIG. 13 uses similar reference labels for components in FIG. 13 that correspond to similar components in FIG. 12. For example, in system 1300 the DMD is 1303, while in FIG. 12 the DMD in system 1200 is 1203. In FIG. 13, under control of the processor 1335, laser or illumination source 1305 outputs a beam of light. The light strikes the face of the DMD at an incidence angle such as 24 degrees to the surface of DMD 1303, which can have a 12 degree tilt angle, so that the beam exits the system 1300 at zero degrees. Referring back to the DMD mirror illustration in FIG. 5A hereinabove, the micromirrors have an ON state tilt angle direction and a different OFF state tilt angle direction. Light reflected by the DMD will exit the surface of the DMD in different directions for ON and OFF states. In image projection systems, the system typically directs OFF state light to a light dump or thermal heat sink. In contrast to the conventional DMD projection systems, in the embodiments the OFF state beams form additional scan patterns and thereby increase efficiency. In FIG. 13, patterns form by both ON state and OFF state reflections from the surface of DMD 1303. The On-state scan beam 1309 causes a first scan pattern in the field of view. The efficiency of the first order pattern from the on state is approximately 10%. If this On-state scan beam 1309 were the only one used for scanning, the total efficiency for the system 1300 would be about 10%. However, as described hereinabove, each diffraction pattern at the DMD display results in two images in the field of view. FIG. 13 shows a first order On-state conjugate beam 1311, which is the conjugate pattern of the ON state beam 1309. Further, in this embodiment a scan pattern uses the OFF state pattern. The OFF state beam will deflect from the surface of the DMD 1303 at a different angle than the ON state beam due to the differing tilt angles such as shown in FIG. 5A. In FIG. 13, Off-state scan beam 1315 leaves the DMD 1303 at a different angle than the On-state scan beam. The Off-state conjugate beam 1317 leaves the DMD 1303 at another angle. Each of these four beams forms an individual scan pattern that creates reflections detected by a sensor. FIG. 13 shows four sensors for efficient processing; these are detectors 1321, 1323, 1325 and 1327. In the embodiments, diffraction patterns have about 50% of the mirrors in the ON state and about 50% of the mirrors in the DMD are in the OFF state for each pattern, to increase efficiency. In an alternative arrangement, fewer sensors can sense reflections from the different patterns in time-sharing operations. In some embodiments, only some of the four possible scan patterns are used. In alternative embodiments, a single detector can be used that can detect reflections from more than one of the On-state, On-state conjugate, Off-state, and Off-state conjugate scan beams. A moveable single sensor can detect reflections from the different scan patterns in a time division scheme.

Also shown in FIG. 13 is the zero order beam 1319. As seen in the example diffraction pattern image illustrated above in FIG. 8C, the diffraction pattern will always create a zero order component that is in the center part of the image. Because this zero order component does not move, it does not form a pattern used for scanning. In one embodiment, a light dump or reflector blocks the zero order beam so that it does enter the field of view and cause any object reflections. In another example embodiment, the zero order beam reflects from a mirror positioned with the DMD, and the reflection becomes a time reference. Using the distance traveled to the mirror and the distance back to a sensor of the zero order beam provides a time reference for use in determining time-of-flight for other reflections.

By using the on state beam, the conjugate on state beam, the off state beam and the conjugate off state beam, the total efficiency of the system can increase to approximately 40%. This efficiency is much greater than the nominal 10%-12% efficiency obtained by using the first order ON state beam alone. The increase in efficiency occurs by use of the DMD with an ON state and OFF state tilt as a diffractive element, and comes at no additional cost in terms of components and processing.

Figure 14:
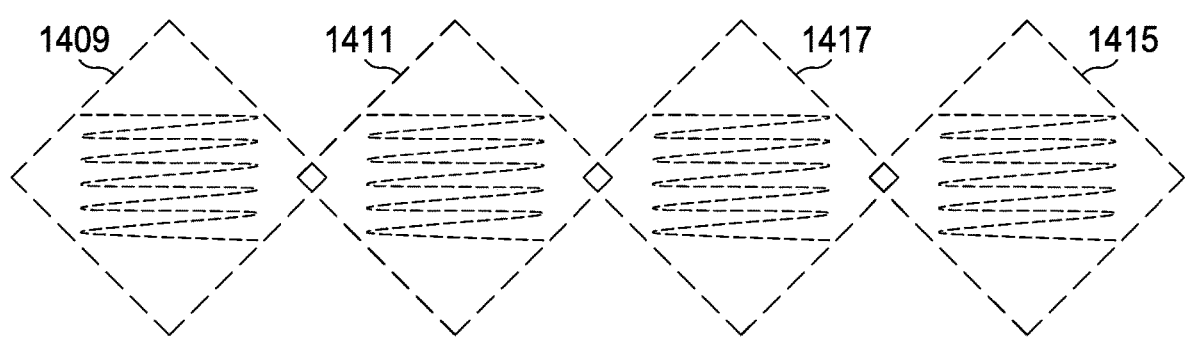
FIG. 14 is a diagram of scan patterns.

FIG. 14 illustrates the scan beams obtained using a DMD with a diamond pixel mirror arrangement as described hereinabove. Because the diamond pixel oriented micromirrors tilt about a vertical axis, the on state and off state reflections coming off the mirror surfaces are horizontally displaced. Further, the conjugate on and off state beams are also horizontally displaced. FIG. 14 shows the four beams in an example scan pattern in a field of view. The pattern 1409 corresponds to the ON state first order scan pattern, the pattern 1411 corresponds to the conjugate ON state first order scan pattern, the pattern 1417 corresponds to the OFF state first order scan pattern, and the pattern 1415 corresponds to the OFF state conjugate first order scan pattern. Because the four scan patterns are displaced horizontally across the field of view, the optics needed in a system to form this pattern can be simplified when using a diamond pixel oriented DMD. However, the system can use any DMD device. In a square pixel or Manhattan oriented DMD device, offset optics can be used to extend the field of view and to align the beam patterns from the various ON and OFF states and the corresponding conjugate states.

The embodiments can also perform adaptive scene scanning. In one embodiment, an adaptive scene scan can increase the sampling density of the scan beam for a portion of a scene. In one example, adaptive scanning occurs when the system detects an object. The adaptive scan capability is possible because the pattern created in the field of view adaptively changes simply by changing the diffraction pattern displayed using the DMD, and illuminating the DMD. Further, the embodiments can create multiple beam patterns in the far field image plane with a single illumination source by adaptively modifying the diffraction patterns displayed using the DMD. No additional hardware is required to create these multiple beam patterns.

Figure 15:
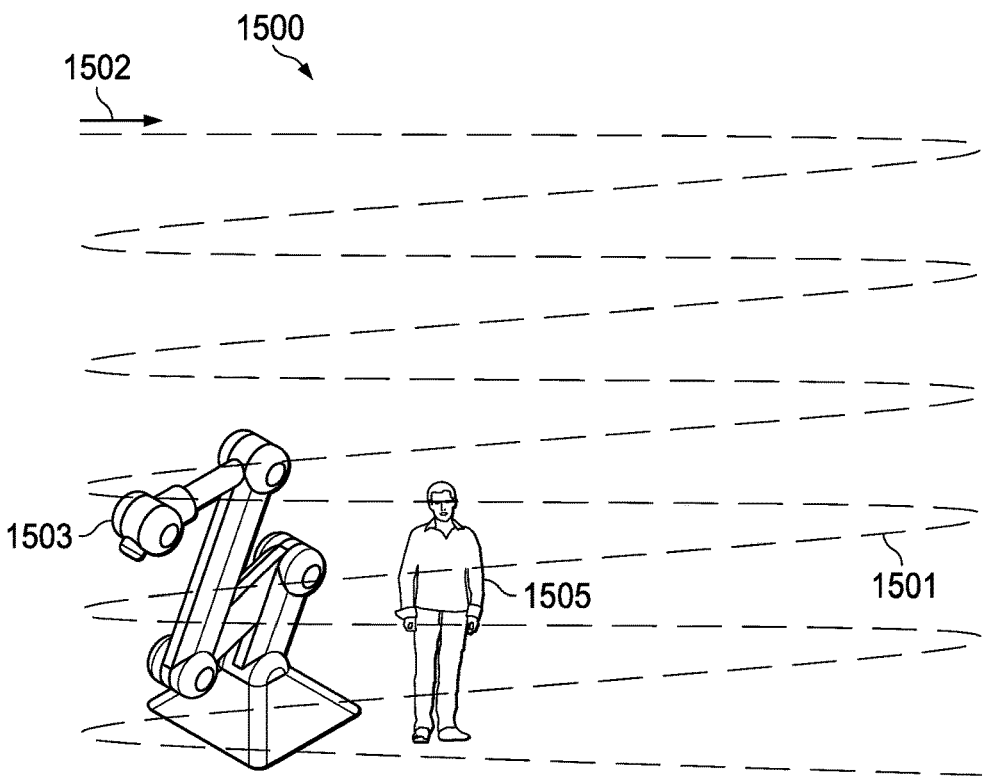
FIG. 15 illustrates a scanning pattern on objects in a field of view.

FIG. 15 shows a scan pattern 1501 in a field of view 1500. In this example, a raster scan pattern is shown. FIG. 15 shows robot arm 1503 in the field of view. FIG. 15 shows a human 1505 walking towards the robot arm and in close proximity to the robot arm 1503. In FIG. 15, scan pattern 1501 begins at arrow 1502 and continues scanning across the scene and towards the bottom of the field of view. In an industrial application, a safety system can stop the operation of a robotic arm when a person or another object approaches the robotic arm device. Here the distance between the objects is of interest. When a human enters an area considered too close to the robotic arm, the system can take action by sounding audible alarms, enabling visual alarms such as lights or signs, or stopping operation of the robot arm until the area is again free from other objects or persons and the robot arm is again safe to move.

Figure 16:
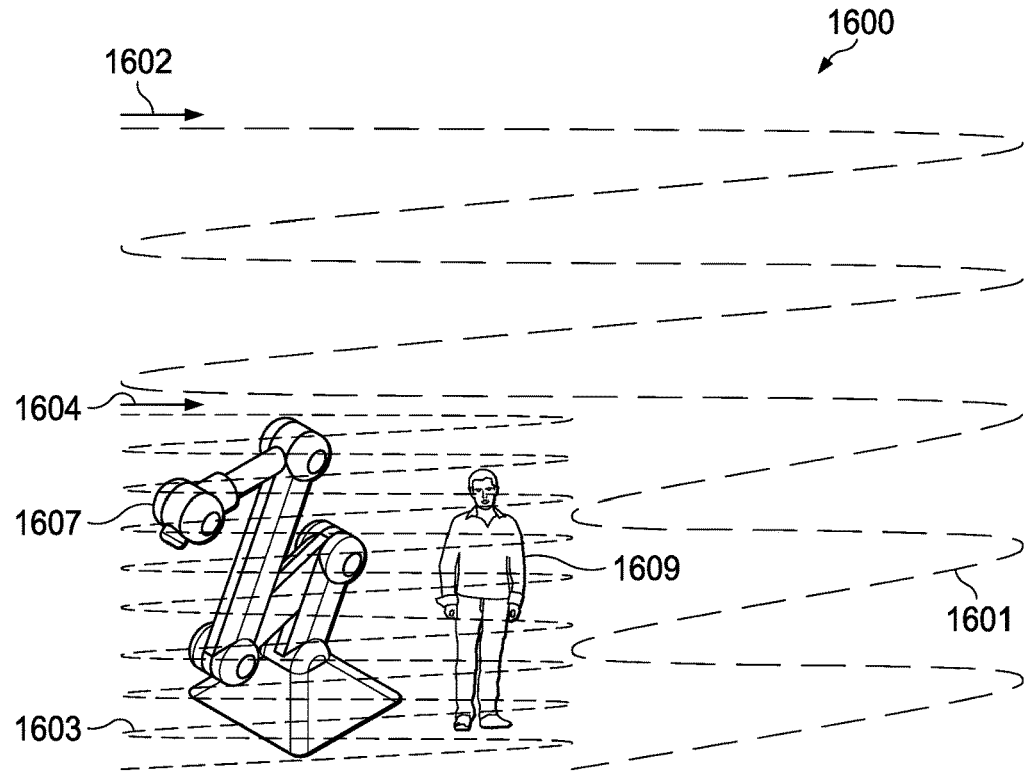
FIG. 16 illustrates an adapted scanning pattern on objects in a field of view.

FIG. 16 illustrates the operation of an embodiment method using a scene adaptive scanning pattern to scan a field of view similar to the field of view of FIG. 15. Field of view 1600 includes a robotic arm 1607 and a human 1609 shown near the robotic arm 1607. A first scan pattern 1601 is a first raster scan pattern that covers a portion of the field of view. A second scan pattern 1603 covers a second portion of the field of view. In this example, the second scan pattern 1603 has a beam sample density greater than the first scan pattern 1601.

In operation, the scan pattern 1601 starts at position 1602 and processes through a portion of the field of view where no object was detected in a prior scan. The scan pattern 1603 begins at position 1604 and processes through the area of the field of view where the robotic arm was detected. Because the second scan pattern 1603 is denser than the first scan pattern 1601, it is of higher resolution (more coverage) than the lower resolution pattern of 1601. By changing the diffraction patterns displayed using the DMD, the sample density adjusts to get more information in areas where objects are detected in proximity to other objects, or for other reasons. The DMDs in the embodiments provide a scene adaptive scan resolution without the need for any additional components or without any other changes to the existing system. The diffraction patterns can create multiple scan beams in the field of view with only changes to the diffraction patterns displayed using the DMD, and these changes can be in response to the detection of objects to form scene adaptive scanning patterns.

Figure 17:
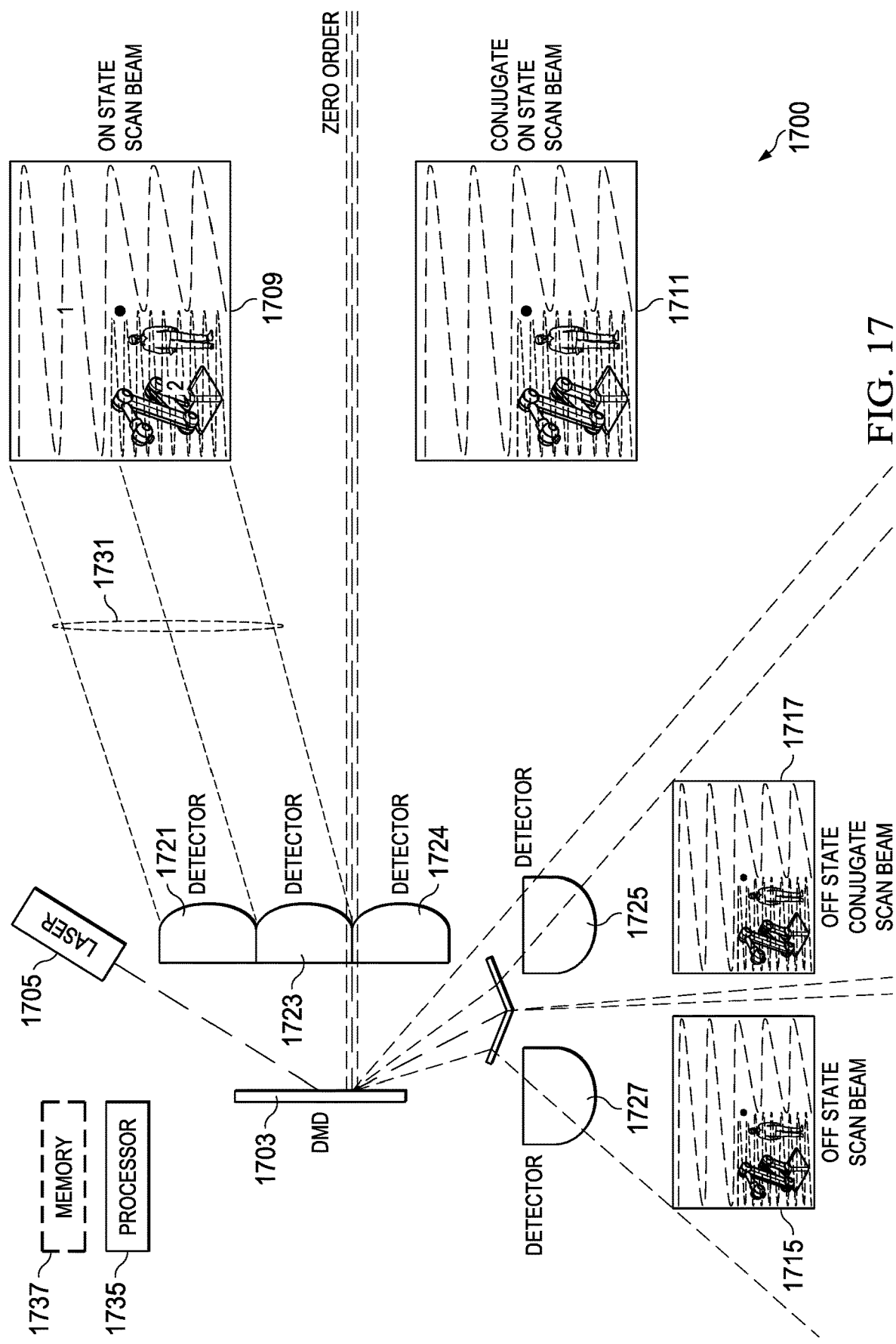
FIG. 17 is a block diagram of the system of FIG. 13 in an adaptive scan operation.

FIG. 17 depicts in a block diagram a top view of another system embodiment. The reference labels used in FIG. 17 are similar to those in FIG. 13 for components that have similar functions, however in FIG. 17 the reference labels start with "17," for ease of comprehension. For example, DMD 1703 is similar to DMD 1303 in FIG. 13. In system 1700, a processor 1735 provides diffraction patterns to a DMD 1703 and controls illumination of laser 1705. An optional memory 1737 can store diffraction patterns as described hereinabove. Each of the scan beams 1709, 1711, 1715, and 1717, the On state scan beam; the Conjugate On state Scan beam; the Off state Scan beam; and the Off state Conjugate Scan beam; has two scan patterns such as those shown in FIG. 16. The first scan pattern shown as "1" in 1709 is of coarse resolution, while the second scan pattern "2" provides a finer resolution scan in an area of interest. Note that the two scan patterns labeled 1 and 2 in the scan beam 1709 are produced simultaneously. The diffraction patterns are not alternating in time. Instead, multiple scan patterns can be produced at the same time simply by modifying the diffraction patterns displayed using the DMD. The sample density can be greatly increased as a result. The detectors 1721, 1723, 1724, 1725, 1727, receive reflections from objects such as 1731. FIG. 17 also includes more than four detectors. In the embodiments, additional detectors can allow for faster processing and more coverage. In the embodiments, first and second scan patterns can display simultaneously. Additional detectors can match the simultaneously displayed scan patterns thus increasing the effective scan rate. Alternatively, additional embodiments can use fewer detectors.

Figure 18:
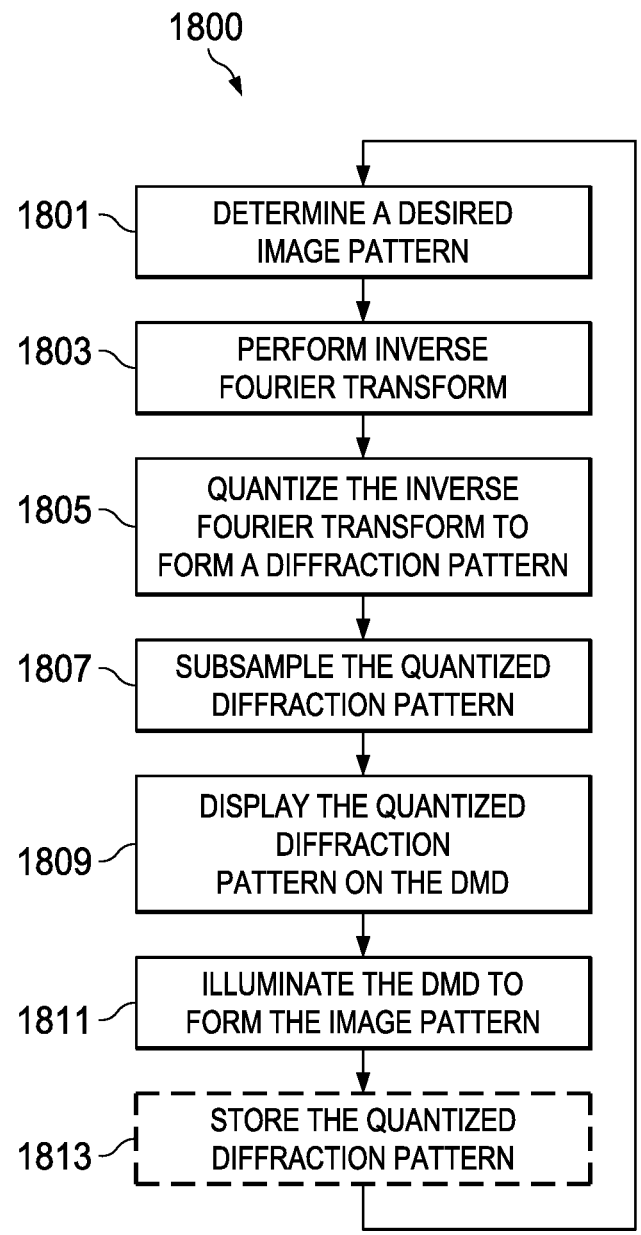
FIG. 18 is a flow diagram of a method of generating diffraction patterns.

FIG. 18 depicts a flow diagram for an example method 1800. In FIG. 18, the method begins at step 1801, where a desired image pattern is determined. This image will appear in the field of view. At step 1803, the method performs an inverse Fourier transform. Fast Fourier transforms such as discrete Fourier transforms can perform the inverse Fourier transform. At step 1805, the method performs a quantization or binarization step. Because the DMD is a binary amplitude modulator with two states, ON and OFF, the method quantizes the inverse Fourier transform for use with the binary format of the DMD. In step 1807, the method subsamples the quantized diffraction pattern formed in step 1805 to match the particular DMD mirror orientation in the system. For a diamond pixel device, a different subsampling applies than that for a square pixel device. At step 1809, the diffraction pattern is displayed using the DMD. At step 1811, the method illuminates the diffraction pattern by the light source to form the image pattern. The image pattern forms as wavefronts of diffracted light constructively and destructively interfere as the wavefronts move away from the DMD, and the desired pattern appears in the field of view. Step 1813 shows an optional storage step. Diffraction patterns can be stored in a pattern memory for later retrieval and display. Alternatively, the method can compute the DMD diffraction patterns as needed in real time. Algorithms also exist that generate periodic diffraction patterns and that can be performed quickly without the use of Fourier transforms, and these algorithms can be used with the embodiments.

Figure 19:
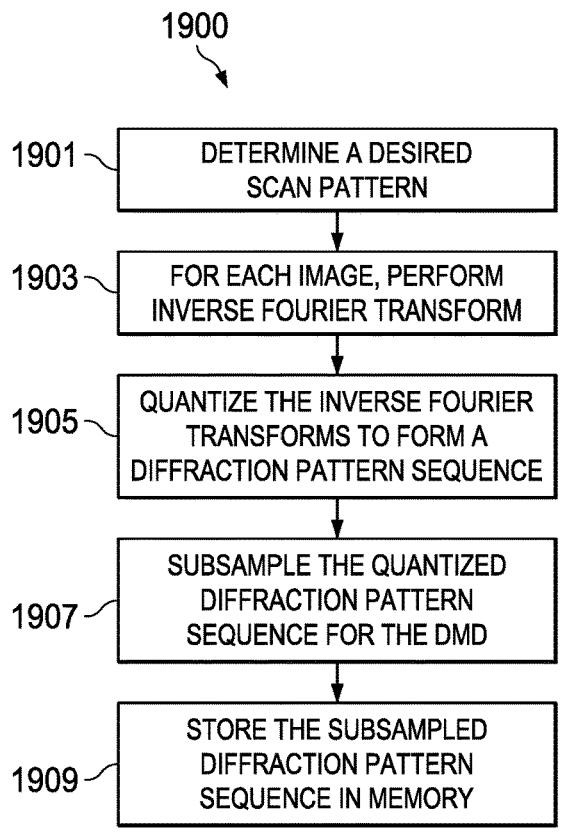
FIG. 19 is a flow diagram of a method of forming diffraction pattern templates.

FIG. 19 illustrates in a flow diagram a method 1900 for forming diffraction pattern templates for use in the embodiments. In FIG. 19, the method begins at step 1901 where a desired scan pattern is determined. For example, the method can select a raster scan pattern. At step 1903, for each image in the pattern, the method performs an inverse Fourier transform. Because a scan pattern is a sequence of images, the method performs a plurality of inverse Fourier transforms. At step 1905, the method quantizes or performs binarization for each of the inverse Fourier transforms to form a diffraction pattern sequence for the binary DMD array. At step 1907, each of the quantized diffraction patterns is subsampled to map it to the DMD used in a particular embodiment. At step 1909, the subsampled and quantized diffraction pattern sequence is stored in memory.

The method of FIG. 19 illustrates that the diffraction patterns can be computed "off-line" or in a calibration operation during manufacture of an embodiment system, and then the patterns can be stored for later use. In this approach, the system does not have to perform real time computations of the diffraction patterns during operation.

Figure 20:
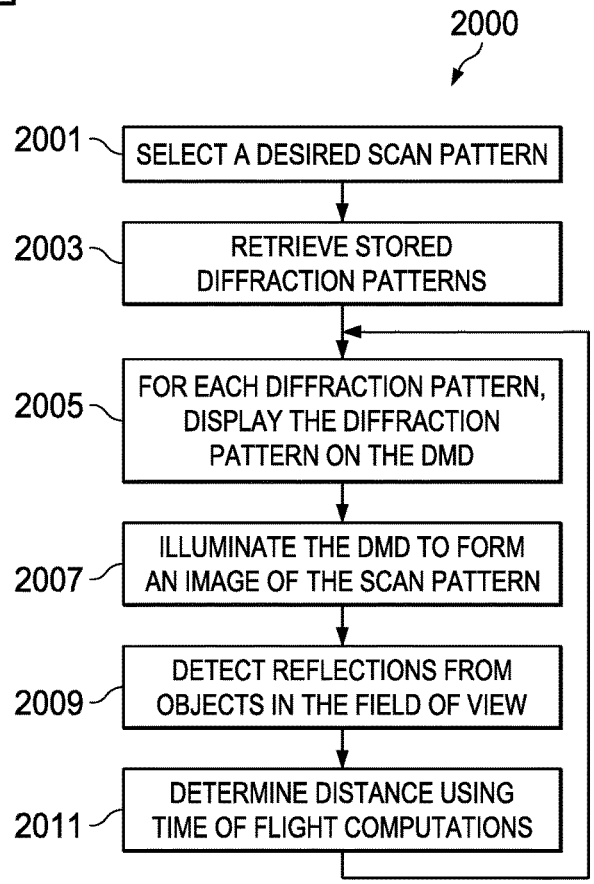
FIG. 20 is a flow diagram of a method of using stored diffraction patterns to form a scan pattern.

In FIG. 20, illustrates in a flow diagram a method 2000 for using the stored diffraction patterns to form a scan pattern. Beginning at step 2001, a desired scan pattern is selected from a number of stored scan patterns. At step 2003, the method retrieves the stored diffraction patterns. At step 2005, a looping operation begins. For each diffraction pattern in a sequence needed to form the selected scan pattern, the method displays the selected diffraction pattern using the DMD. At step 2007, the method illuminates the DMD to form an image that is part of the scan pattern. At step 2009, the method detects reflections from any objects illuminated in the field of view. At step 2011, the method determines distance to the objects using time-of-flight computations. The method continues looping through the sequence to continue scanning the field of view by returning to step 2005.

The embodiments form light detection and distance measurement systems useful in a wide variety of applications. Mobile navigation and collision avoidance systems, robotics, autonomous vehicle control, security, industrial automation, surveying, mapping, and meteorology are all applications for LIDAR systems including the embodiments. The systems use solid-state components without the need for mechanical parts. Because DMD devices can operate even with a large percentage of failed micromirrors, the systems are inherently robust and reliable and are relatively low in cost. Use of a single illumination source and the lack of motors and rotors further reduces system cost, reduces system maintenance requirements, and increases reliability over conventional approaches.

Accordingly, in described examples, a system to output a patterned light beam includes a digital micromirror device having an array of micromirrors that each have an ON state and an OFF state, configured to display diffraction patterns that create at least one patterned light beam in a field of view. The system includes an illumination source configured to illuminate the array of micromirrors in the digital micromirror device. The system also includes a processor coupled to the digital micromirror device and the illumination source, configured to provide display diffraction patterns for display using the digital micromirror device, and configured to control the illumination source. At least one detector in the system detects light from the patterned light beam reflected by objects in the field of view.

In a further example, the system includes the illumination source positioned to illuminate micromirrors in the digital micromirror device that are in the ON state to cause an ON state light beam pattern in the field of view and to cause a conjugate ON state light beam pattern in the field of view. In another example, the system includes the illumination source positioned to illuminate micromirrors in the digital micromirror device that are in the OFF state to cause an OFF state light beam pattern in the field of view and to cause a conjugate OFF state light beam pattern in the field of view.

In yet another example the detector includes a plurality of photodetectors arranged to detect reflections from objects illuminated by light beam patterns in the field of view. In still another example, the detector includes a single detector configured to detect reflection from objects caused by different light beam patterns in the field of view. In an alternative example, the system further includes diffraction pattern memory configured to store diffraction patterns for display using the digital micromirror device. In yet another example, in the system includes a digital micromirror device having an array of orthogonally oriented micromirrors that have a diagonal tilt axis. In still another alternative example, the system includes a digital micromirror device that includes an array of diamond-oriented micromirrors that have a vertical tilt axis.

In a further example, the system includes a processor that includes a real time diffraction pattern-generating algorithm for outputting data to the digital micromirror device to display diffraction patterns. In still a further example, the system includes the illumination source that is a laser illumination source or an infrared illumination source. In an alternative example, the system includes a plurality of light beams that extends from the digital micromirror device into a field of view, the plurality of light beams corresponding to an ON state beam, an ON state conjugate beam, an OFF state beam, and an OFF state conjugate beam.

In another example embodiment, a method provides a sequence of patterned light beams into a field of view using a digital micromirror device as a diffractive pattern source. The method begins by determining an image pattern sequence; computing a sequence of diffractive images corresponding to the image pattern sequence; and for the sequence of diffractive images, determining a sequence of quantized diffraction patterns. The method continues by mapping the sequence of quantized image patterns for display. The method continues by using the digital micromirror device, displaying the mapped sequence of quantized patterns; and for the mapped sequence of quantized diffraction patterns displayed using the digital micromirror device, illuminating the digital micromirror device to create the image pattern sequence.

In another example, the method includes storing the sequence of diffraction patterns in a diffraction pattern storage memory. In a further example, the method includes determining a quantized diffraction pattern that simultaneously creates multiple beams in the field of view.

In an additional example, the method includes computing a sequence of diffractive images corresponding to the image pattern sequence including applying an inverse Fourier transform to image patterns in the image pattern sequence.

In an alternative example, the method includes determining a plurality of quantized patterns to form a plurality of diffraction patterns for display using the digital micromirror device, corresponding to a scan beam pattern; storing the plurality of diffraction patterns in a diffraction pattern storage memory; and retrieving the stored diffraction patterns from the diffraction pattern storage memory. The method continues by using the digital micromirror device and displaying the plurality of diffraction patterns using the digital micromirror device in a sequence; illuminating the diffraction patterns using the digital micromirror device in the sequence to form a patterned scan beam in a field of view; and detecting scan beam light reflected from objects in the field of view. In a further example, the method continues by determining a distance of objects in a field of view using time-of-flight calculations.

Another alternative method includes, after detecting objects in a field of view, modifying a selection of the diffraction patterns to create a new scan pattern having a first sampling density for a portion of the new scan pattern and a second sampling density different from the first sampling density for another portion of the new scan pattern. The method continues by creating new diffraction patterns by computing a sequence of new diffraction images corresponding to the new scan pattern, quantizing the new diffraction patterns; subsampling the quantized new diffraction patterns for a digital micromirror device; displaying the subsampled quantized new diffraction patterns using the digital micromirror device; and illuminating the digital micromirror device.

In still another example embodiment, a LIDAR system includes at least one illumination source to illuminate a digital micromirror device with coherent light; and a processor coupled to display diffraction patterns using the digital micromirror device. The LIDAR system also includes at least one detector configured to detect light reflected from objects in a field of view illuminated by a light beam pattern formed due to the illuminating of the diffraction patterns displayed using the digital micromirror device.

In a further example, the LIDAR system includes a plurality of detectors arranged to detect light reflected from objects in the field of view due to at least one of an ON state light beam, an ON state conjugate light beam, an OFF state light beam, and an OFF state conjugate light beam from the digital micromirror device. In an alternative example, the LIDAR system includes the processor coupled to adaptively change a scan pattern by changing the diffraction patterns displayed using the digital micromirror device, responsive to detecting a reflection indicating an object in the field of view.

Modifications are possible in the described embodiments, and other embodiments are possible that are within the scope of the claims.

What is claimed is:

1. A system, comprising:
   circuitry configured to produce a first control signal and a second control signal;
   an illumination source coupled to the circuitry, the illumination source configured to produce light responsive to the second control signal; and
   a spatial light modulator (SLM) having an array of pixels, the SLM coupled to the circuitry and optically coupled to the illumination source, the array of pixels configured to modulate the light in a diffraction pattern responsive to the first control signal to:
   produce an ON state light beam using ON state pixels of the array of pixels in a field of view; and
   produce an OFF state light beam using OFF state pixels of the array of pixels in the field of view.

2. The system of claim 1, wherein the diffraction pattern further produces a conjugate ON state light beam in the field of view.

3. The system of claim 2, wherein the diffraction pattern further comprises a conjugate OFF state light beam in the field of view, including by illuminating pixels having an OFF state in the SLM.

4. The system of claim 3, further comprising at least one detector configured to detect a reflection of the ON state light beam and the OFF state light beam in the field of view.

5. The system of claim 4, wherein the at least one detector is multiple photodetectors or a single detector.

6. The system of claim 1, further comprising a memory configured to store information representative of the diffraction pattern.

7. The system of claim 1, wherein the array of pixels is: an array of orthogonally oriented pixels that have a diagonal tilt axis; or an array of diamond-oriented pixels that have a vertical tilt axis.

8. The system of claim 1, wherein the circuitry is configured to provide the first control signal responsive to a real time pattern-generating algorithm.

9. The system of claim 1, wherein the illumination source is a laser illumination source or an infrared illumination source.

10. The system of claim 4, wherein the at least one detector is configured to detect the reflection of the ON state light beam, the conjugate ON state light beam, the OFF state light beam, and the conjugate OFF state conjugate light beam.

11. A method comprising:
determining, by circuitry, an image pattern sequence;
computing, by the circuitry, a sequence of diffractive images for the image pattern sequence;
for the sequence of diffractive images, determining, by the circuitry, a sequence of quantized patterns;
mapping the sequence of quantized patterns to produce a mapped sequence of quantization patterns; and
instructing, by the circuitry, a spatial light modulator (SLM) to modulate light in the mapped sequence of quantized patterns to form the image pattern sequence in a field of view.

12. The method of claim 11, further comprising:
storing the sequence of quantized patterns in a memory.

13. The method of claim 11, further comprising:
determining a quantized pattern that simultaneously forms multiple beams in the field of view.

14. The method of claim 11, wherein computing the sequence of diffractive images includes: applying an inverse Fourier transform to image patterns in the image pattern sequence.

15. The method of claim 11, further comprising:
determining quantized patterns to form the mapped sequence of quantized patterns for a patterned scan beam;
storing the mapped sequence of quantized patterns in a memory;
retrieving the mapped sequence of quantized patterns from the memory;
using the SLM, modulating the light in the mapped sequence of quantized patterns to form the patterned scan beam in the field of view;
detecting a reflection of the patterned scan beam in the field of view; and
responsive to the detecting, determining a distance of an object in the field of view using time-of-flight calculations.

16. The method of claim 15, wherein the image pattern sequence is a first image pattern sequence, the sequence of diffractive images is a first sequence first diffractive images, and the sequence of quantized patterns is a first sequence of quantized patterns, the method further comprising:
responsive to the detecting:
producing a second image pattern sequence having a first sampling density for a first portion of the second image pattern sequence and a second sampling density different from the first sampling density for a second portion of the second image pattern sequence;
computing a second sequence of diffractive images for the second image pattern sequence;
for the second sequence of diffractive images, determining a second sequence of quantized patterns;
sub sampling the second sequence of quantized patterns; and
using the SLM, modulating the light in the subsampled second quantized patterns to form the second image pattern sequence in the field of view.

17. A vehicle comprising:
a roof; and
a LIDAR system on the roof, the LIDAR system comprising:
circuitry configured to produce a first control signal and a second control signal;
an illumination source coupled to the circuitry, the illumination source configured to produce light responsive to the second control signal;
a spatial light modulator (SLM) having an array of pixels, the SLM coupled to the circuitry and optically coupled to the illumination source, the array of pixels configured to modulate the light in a diffraction pattern responsive to the first control signal to:
produce an ON state light beam using ON state pixels of the array of pixels in a field of view; and
produce an OFF state light beam using OFF state pixels of the array of pixels in the field of view; and
at least one detector configured to detect a reflection of the ON state light beam and the OFF state light beam in the field of view.

18. The vehicle of claim 17, wherein the diffraction pattern is further configured to:
produce a conjugate ON state light beam using ON state pixels of the array of pixels in the field of view; and
produce a conjugate OFF state light beam using OFF state pixels of the array of pixels in the field of view.

19. The vehicle of claim 17, wherein the diffraction pattern includes a scan pattern, the circuitry is coupled to the at least one detector, and the circuitry is configured to adaptively change the scan pattern by changing the scan pattern, responsive to the at least one detector detecting the reflection of the diffraction pattern in the field of view.

20. The vehicle of claim 18, wherein the at least one detector is configured to detect a reflection of the ON state light beam, a reflection of the conjugate ON state light beam, a reflection of the OFF state light beam, and a reflection of the conjugate OFF state light beam.

* * * * *